(12) United States Patent
Deever et al.

(10) Patent No.: US 8,355,074 B2
(45) Date of Patent: Jan. 15, 2013

(54) EXPOSING PIXEL GROUPS IN PRODUCING DIGITAL IMAGES

(75) Inventors: Aaron T. Deever, Pittsford, NY (US);
Bruce H. Pillman, Rochester, NY (US);
John T. Compton, LeRoy, NY (US);
Amy D. Enge, Spencerport, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/541,611

(22) Filed: Jul. 3, 2012

(65) Prior Publication Data

US 2012/0300105 A1 Nov. 29, 2012

Related U.S. Application Data

(63) Continuation of application No. 12/416,172, filed on Apr. 1, 2009, now Pat. No. 8,218,068.

(51) Int. Cl.
*G03B 7/00* (2006.01)
*H04N 5/235* (2006.01)

(52) U.S. Cl. ........................................................ 348/362

(58) Field of Classification Search .................. 348/296, 348/362
See application file for complete search history.

(56) References Cited

U.S. PATENT DOCUMENTS

| | | | |
|---|---|---|---|
| 3,971,065 A | 7/1976 | Bayer | |
| 4,246,601 A | 1/1981 | Sato et al. | |
| 4,390,895 A | 6/1983 | Sato et al. | |
| 4,479,242 A | 10/1984 | Kurata | |
| 5,323,233 A | 6/1994 | Yamagami et al. | |
| 5,773,814 A | 6/1998 | Phillips et al. | |
| 6,115,065 A | 9/2000 | Yadid-Pecht et al. | |
| 6,278,490 B1 | 8/2001 | Fukuda et al. | |
| 6,348,681 B1 | 2/2002 | Kindt et al. | |
| 6,476,865 B1 | 11/2002 | Gindele et al. | |

(Continued)

FOREIGN PATENT DOCUMENTS

JP H05-130519 5/1993

(Continued)

OTHER PUBLICATIONS

PCT/US2008/008379—International Search Report and Written Opinion of the International Searching Authority, mailed Sep. 30, 2008 (7 pages).

(Continued)

*Primary Examiner* — Clayton E Laballe
*Assistant Examiner* — Noam Reisner
(74) *Attorney, Agent, or Firm* — Blakely Sokoloff Taylor & Zafman LLP

(57) ABSTRACT

An imaging system and method for producing a digital image from pixel signals captured by a pixel array is disclosed. First pixel signals, generated during a first exposure period, are read out from a first group of pixels of the pixel array. The first group of pixels is reset after reading out the first pixel signals. Second pixel signals from the first group of pixel are read out after resetting the first group of pixels. The second pixel signals are generated during a second exposure period. Third pixel signals from a second group of pixels of the pixel array are read out. The third pixel signals are generated during a third exposure period that overlaps at least a portion of the first and second exposure periods. The first, second, and third pixel signals are used to produce the digital image.

42 Claims, 21 Drawing Sheets

U.S. PATENT DOCUMENTS

| | | |
|---|---|---|
| 6,829,008 B1 | 12/2004 | Kondo et al. |
| 6,924,841 B2 | 8/2005 | Jones |
| 6,999,119 B1 | 2/2006 | Shibazaki et al. |
| 7,099,056 B1 | 8/2006 | Kindt |
| 7,215,831 B2 | 5/2007 | Altunbasak et al. |
| 7,330,218 B2 | 2/2008 | Lin et al. |
| 7,372,504 B2 | 5/2008 | Fujimura |
| 7,379,612 B2 | 5/2008 | Milanfar et al. |
| 7,446,812 B2 | 11/2008 | Ando et al. |
| 7,492,391 B1 | 2/2009 | Kaplinsky |
| 7,855,740 B2 | 12/2010 | Hamilton, Jr. et al. |
| 7,911,507 B2 | 3/2011 | Egawa et al. |
| 8,218,068 B2 | 7/2012 | Deever et al. |
| 2005/0151866 A1* | 7/2005 | Ando et al. .................. 348/297 |
| 2005/0231618 A1 | 10/2005 | Sugiyama |
| 2006/0274171 A1 | 12/2006 | Wang |
| 2007/0024931 A1 | 2/2007 | Compton et al. |
| 2007/0046807 A1 | 3/2007 | Hamilton, Jr. et al. |
| 2007/0268533 A1* | 11/2007 | Kijima et al. ................. 358/512 |
| 2008/0173794 A1 | 7/2008 | Oike et al. |
| 2008/0211941 A1 | 9/2008 | Deever et al. |
| 2009/0021621 A1 | 1/2009 | Hashimoto et al. |
| 2009/0059045 A1* | 3/2009 | Kobayashi et al. .......... 348/296 |
| 2009/0219425 A1 | 9/2009 | Kobayashi et al. |
| 2009/0251575 A1 | 10/2009 | Wada |
| 2009/0268055 A1 | 10/2009 | Hamilton, Jr. et al. |

FOREIGN PATENT DOCUMENTS

| | | |
|---|---|---|
| JP | 2006-190958 | 7/2006 |

OTHER PUBLICATIONS

CN 200880025375.6—First Chinese Office Action, issued Aug. 24, 2011, with English Translation (20 pages).

CN 200880025375.6—Second Chinese Office Action, issued May 14, 2012, with English Translation (10 pages).

PCT/US2010/000942, PCT International Search Report and Written Opinion of the Searching Authority mailed Jul. 15, 2010, (13 pages).

PCT/US2010/000942—International Preliminary Report on Patentability, issued Oct. 4, 2011 (6 pages).

U.S. Office Action mailed Oct. 27, 2011, U.S. Appl. No. 12/416,172, filed Apr. 1, 2009 (19 pages).

U.S. Notice of Allowance mailed Apr. 24, 2012, U.S. Appl. No. 12/416,172, filed Apr. 1, 2009 (13 pages).

JP 2010-516984—First Office Action with Translation, mailed Sep. 25, 2012, 10 pages.

* cited by examiner

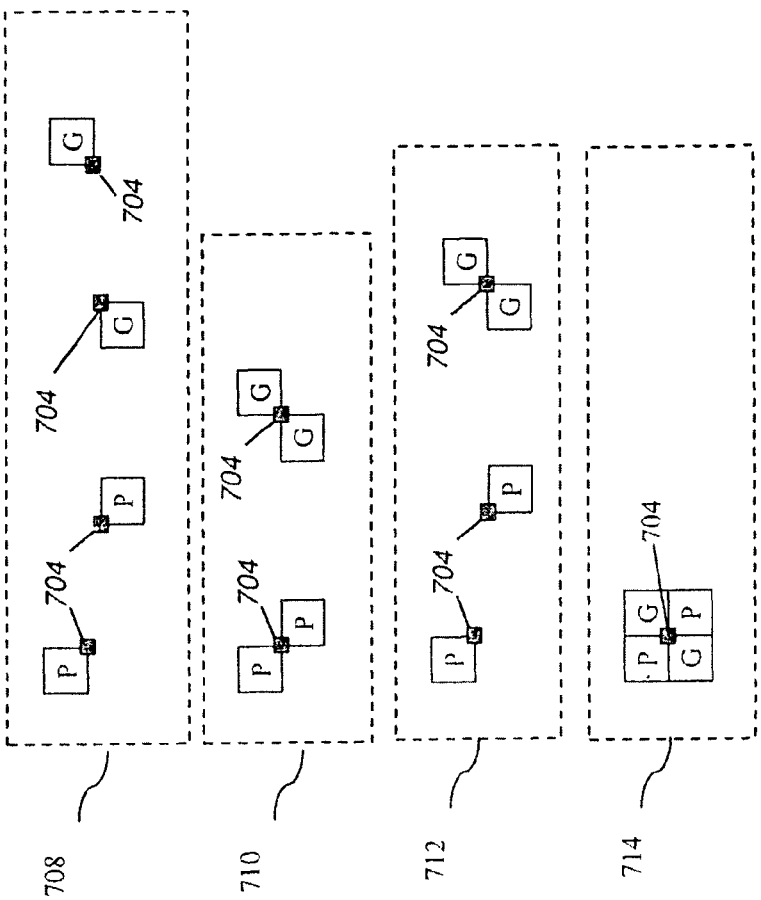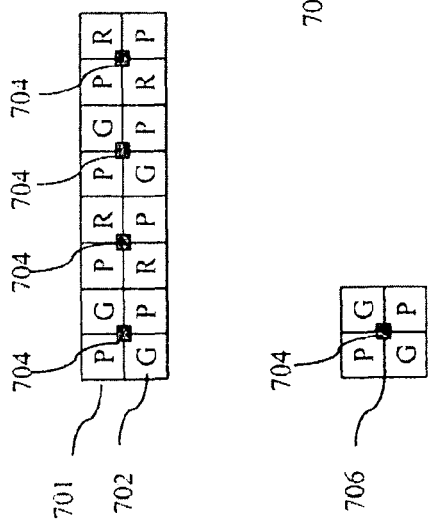
FIG. 8
*(Prior Art)*

EXPOSING PIXEL GROUPS IN PRODUCING DIGITAL IMAGES

CROSS-REFERENCE

This application is a continuation of, and claims priority to, U.S. application Ser. No. 12/416,172, filed Apr. 1, 2009, now pending.

Reference is made to commonly-assigned U.S. patent application Ser. No. 11/780,523 filed Jul. 20, 2007 entitled "MULTIPLE COMPONENT READ OUT OF IMAGE SENSOR" to Hamilton, et al., the disclosure of which is incorporated herein.

FIELD OF THE INVENTION

The present invention relates to an image capture device using a two-dimensional image sensor array with multiple exposures and readouts to produce a digital image.

BACKGROUND OF THE INVENTION

In digital imaging, it is desirable to capture an image sequence having high image quality, high spatial resolution and high temporal resolution, also referred to as frame rate. With many current image sequence capture devices, however, it is not possible to obtain such high quality image sequences. In many cases, one of the desired image sequence attributes is obtained at the expense of the others. For example, in a conventional image sequence capture device, the exposure duration for a given image is limited by the frame rate. The higher the frame rate, the shorter each image exposure must be. In a low-light environment, individual image captures within an image sequence can receive insufficient light and produce noisy images. The quality of a given image with respect to noise can be improved by utilizing longer exposure durations for each image, but this comes at the expense of a lower frame rate. Alternatively, the image quality with respect to noise can be improved by combining pixels through the technique of binning; however this improvement comes at the expense of lower spatial resolution. In many cases the spatial and temporal resolution of the image sequence are limited by the readout capabilities of the sensor. A sensor is capable of reading a certain number of pixels per second. This readout capability is balanced between spatial and temporal resolution of the readouts. Increasing one must come at the expense of the other in order to keep the total number of pixels read within the achievable range of the sensor.

Many solutions have been proposed to allow a digital image sequence capture device to capture image sequences with improved quality and resolution. One method to reduce noise in a digital image sequence is through temporal noise cleaning. An example of such a technique is given in U.S. Pat. No. 7,330,218. Temporal noise reduction techniques exploit the high temporal correlation among neighboring images to achieve noise reduction. In static scenes, multiple readouts of the same image scene content are available in successive images, allowing for effective noise reduction. The drawbacks of temporal noise reduction include memory requirements to buffer multiple images, as well as computational requirements to filter the images, in particular if motion estimation and compensation are used to align regions of local or global motion. Additionally, temporal noise reduction does nothing to improve the spatial or temporal resolution of the image sequence.

One method to improve temporal resolution is temporal frame interpolation. Those skilled in the art will recognize, however, that such techniques are computationally complex, memory intensive, and often generate artifacts in the interpolated frames.

One method to improve the spatial resolution of an image sequence is through super-resolution techniques. Examples of super-resolution algorithms are provided in U.S. Pat. Nos. 7,215,831 and 7,379,612. Video super-resolution techniques use neighboring frames to estimate each high-resolution video frame. The drawbacks of spatial video super-resolution include computational complexity and memory requirements. Dynamic scenes are also difficult for spatial super-resolution algorithms to process.

Another method to improve the quality of a digital image sequence is through the use of a dual-sensor camera. Such a system is proposed in US Patent Application 2008/0211941, "Digital Camera Using Multiple Image Sensors to Provide Improved Temporal Sampling." Improved temporal resolution can be achieved by staggering the exposures of the dual sensors Improved image quality and noise reduction are possible by exposing the two sensors equally and then combining the resultant images. The drawbacks to this solution include the costs associated with a dual sensor camera. Additionally, in a dual-lens device, the need exists to spatially align images captured from the different lens systems.

Another method to improve spatial resolution is by capturing an intermittent high resolution image along with the low resolution image sequence, followed by processing to generate an entire high resolution image sequence from the aggregate data. Examples of such solutions are U.S. Pat. Nos. 7,110,025 and 7,372,504. The drawbacks of this solution include in some cases the requirement of an additional sensor and other hardware to capture the high resolution image without disrupting the image sequence capture process. Other drawbacks include the need to buffer multiple images, depending on the frequency and usage of the high resolution images in generating the final high resolution image sequence.

Another method for improving the quality of an image sequence is through the use of an image sensor with improved light sensitivity. Many image sensors use a combination of red, green and blue color filters arranged in the familiar Bayer pattern, as described in U.S. Pat. No. 3,971,065. As solutions for improving image capture under varying light conditions and for improving overall sensitivity of the imaging sensor, modifications to the familiar Bayer pattern have been disclosed. For example, commonly assigned U.S. Patent Applications Publication No. 2007/0046807 entitled "Capturing Images Under Varying Lighting Conditions" by Hamilton et al. and Publication No. 2007/0024931 entitled "Image Sensor with Improved Light Sensitivity" by Compton et al. both describe alternative sensor arrangements that combine color filters with panchromatic filter elements, interleaved in some manner. With this type of solution, some portion of the image sensor detects color; the other panchromatic portion is optimized to detect light spanning the visible band for improved dynamic range and sensitivity. These solutions thus provide a pattern of pixels, some pixels with color filters (providing a narrow-band spectral response) and some without (unfiltered pixels or pixels filtered to provide a broad-band spectral response).

Using a combination of both narrow- and wide-spectral band pixel responses, image sensors can be used at lower light levels or provide shorter exposure durations. See Sato et al in U.S. Pat. No. 4,390,895, Yamagami et al in U.S. Pat. No. 5,323,233, and Gindele et al in U.S. Pat. No. 6,476,865. Such sensors can provide improved image quality at low light levels, but additional techniques are required to address the need for producing image sequences with improved spatial and temporal resolution.

In digital imaging, it is also desirable to capture an image sequence having high dynamic range. In photography and imaging, the dynamic range represents the ratio of two luminance values, with the luminance expressed in candelas per square meter. The range of luminance human vision can handle is quite large. While the luminance of starlight is around 0.001 cd/m2, that of a sunlit scene is around 100,000 cd/m2, which is one hundred million times higher. The luminance of the sun itself is approximately 1,000,000,000 cd/m2. The human eye can accommodate a dynamic range of approximately 10,000:1 in a single view. The dynamic range for a camera is defined as the ratio of the intensity that just saturates the camera to the intensity that just lifts the camera response one standard deviation above camera noise. In most commercially available sensors today, the maximum ratio of signal to noise for a pixel is about 100:1. This, in turn, represents the maximum dynamic range of the pixel.

Since most digital cameras are only able to capture a limited dynamic range (the exposure setting determines which part of the total dynamic range will be captured), high dynamic range images are commonly created from captures of the same scene taken under different exposure levels. For most daylight outdoor scenes excluding the sun, three exposures spaced by two exposure values apart are often sufficient to properly cover the dynamic range. However, this method requires a scene that does not change between the captures in the series.

Jones (U.S. Pat. No. 6,924,841 B2) discloses a method for extending the dynamic range of a sensor by having two groups of pixels with different sensitivities. However, Jones requires that the sensitivity of the first group of pixels overlaps with the sensitivity of the second group of pixels in order to have some common dynamic range. This method is not desirable because it will not provide a substantial dynamic range for real world scenes. It also requires a specialized sensor with pixels of different sensitivities.

Kindt et al. in U.S. Pat. No. 6,348,681 discloses a method and circuit for setting breakpoints for a sensor to achieve a user selected piecewise linear transfer function.

Ando et al. in U.S. Pat. No. 7,446,812 discloses a method for using dual integration periods during a same frame and readout to increase the dynamic range for a capture. This method does not utilize every photon that reaches the sensor because the pixels with shorter integration time will not capture photons between the time of the readout of those pixels and the pixels with the longer integration time.

Thus, there exists a need for producing a digital image sequence with improved image quality, spatial resolution and temporal resolution, without generating spatial or temporal artifacts, and without significant memory costs, computational costs, or hardware costs.

There also exists a need for producing a high dynamic range image from an image sensor without fundamentally increasing the complexity or composition of the individual pixels in the sensor.

SUMMARY OF THE INVENTION

An advantage of an embodiment of the invention is that sequences of color images with increased spatial resolution, temporal resolution and image quality can be produced without the need for additional lenses and image sensor arrays.

A further advantage of an embodiment of the invention is that sequences of color images with increased spatial resolution, temporal resolution and image quality can be produced without the need for computationally complex and memory intensive algorithms.

A further advantage of an embodiment of the invention is that combinations of sequences of low spatial resolution, high temporal resolution, color images and sequences of high spatial resolution, low temporal resolution, color images can be produced without the need for additional lenses and image sensor arrays.

A further advantage of an embodiment of the invention is that the extended dynamic range image can be produced without the need for additional lenses and image sensor arrays.

A further advantage of an embodiment of the invention is that the extended dynamic range image can be produced with lower buffering and without the need for computationally complex and memory intensive algorithms.

This and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 8 (prior art) is a schematic diagram showing how pixels in adjacent rows can be binned together, sharing the same floating diffusion component;

DETAILED DESCRIPTION OF THE INVENTION

Because digital cameras employing imaging devices and related circuitry for signal capture and correction and for exposure control are well known, the present description will be directed in particular to elements forming part of, or cooperating more directly with, method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
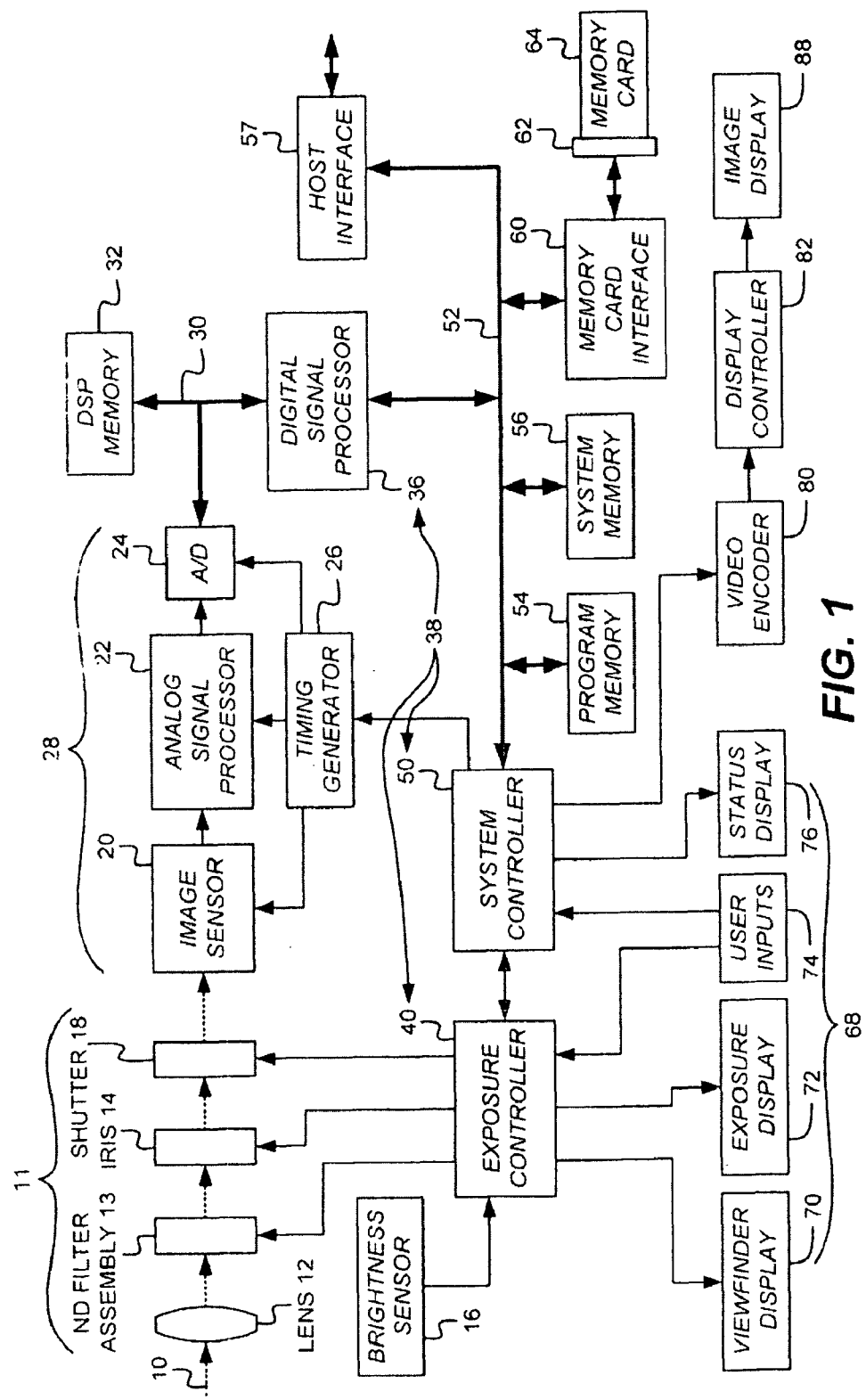
FIG. 1 is a block diagram of a conventional digital still camera system that can employ a conventional sensor and processing methods or the sensor and processing methods of the current invention.

Turning now to FIG. 1, a block diagram of an image capture device shown as a digital camera embodying the present invention is shown. Although a digital camera will now be explained, the present invention is clearly applicable to other types of image capture devices, such as imaging sub-systems included in non-camera devices such as mobile phones and automotive vehicles, for example. Light 10 from the subject scene is input to an imaging stage 11, where the light is focused by lens 12 to form an image on solid-state image sensor 20. Image sensor 20 converts the incident light to an electrical signal by integrating charge for each picture element (pixel). The image sensor 20 of the preferred embodiment is a charge coupled device (CCD) type or an active pixel sensor (APS) type. (APS devices are often referred to as CMOS sensors because of the ability to fabricate them in a Complementary Metal Oxide Semiconductor process). The sensor includes an arrangement of color filters, as described in more detail subsequently. The amount of light reaching the sensor 20 is regulated by an iris block 14 that varies the aperture and the neutral density (ND) filter block 13 that includes one or more ND filters interposed in the optical path. Also regulating the overall light level is the time that the shutter block 18 is open. The exposure controller block 40 responds to the amount of light available in the scene as metered by the brightness sensor block 16 and controls all three of these regulating functions.

The analog signal from image sensor 20 is processed by analog signal processor 22 and applied to analog to digital (A/D) converter 24 for digitizing the sensor signals. Timing generator 26 produces various clocking signals to select rows and pixels and synchronizes the operation of analog signal processor 22 and A/D converter 24. The image sensor stage 28 includes the image sensor 20, the analog signal processor 22, the A/D converter 24, and the timing generator 26. The functional elements of image sensor stage 28 are separately fabricated integrated circuits, or they are fabricated as a single integrated circuit as is commonly done with CMOS image sensors. The resulting stream of digital pixel values from A/D converter 24 is stored in memory 32 associated with digital signal processor (DSP) 36.

Digital signal processor 36 is one of three processors or controllers in this embodiment, in addition to system controller 50 and exposure controller 40. Although this distribution of camera functional control among multiple controllers and processors is typical, these controllers or processors are combined in various ways without affecting the functional operation of the camera and the application of the present invention. These controllers or processors can comprise one or more digital signal processor devices, microcontrollers, programmable logic devices, or other digital logic circuits. Although a combination of such controllers or processors has been described, it should be apparent that one controller or processor is designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in its memory 32 according to a software program permanently stored in program memory 54 and copied to memory 32 for execution during image capture. DSP 36 executes the software needed for practicing image processing shown in FIG. 18. Memory 32 includes any type of random access memory, such as SDRAM. A bus 30 comprising a pathway for address and data signals connects DSP 36 to its related memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, ND filter 13, iris 14, and shutter 18 as previously described, directing the timing generator 26 to operate the image sensor 20 and associated elements, and directing DSP 36 to process the captured image data. After an image is captured and processed, the final image file stored in memory 32 is transferred to a host computer via interface 57, stored on a removable memory card 64 or other storage device, and displayed for the user on image display 88.

A bus 52 includes a pathway for address, data and control signals, and connects system controller 50 to DSP 36, program memory 54, system memory 56, host interface 57, memory card interface 60 and other related devices. Host interface 57 provides a high-speed connection to a personal computer (PC) or other host computer for transfer of image data for display, storage, manipulation or printing. This interface is an IEEE1394 or USB2.0 serial interface or any other suitable digital interface. Memory card 64 is typically a Compact Flash (CF) card inserted into socket 62 and connected to the system controller 50 via memory card interface 60. Other types of storage that are utilized include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

The user interface 68, including all or any combination of viewfinder display 70, exposure display 72, status display 76 and image display 88, and user inputs 74, is controlled by a combination of software programs executed on exposure controller 40 and system controller 50. User inputs 74 typically include some combination of buttons, rocker switches, joysticks, rotary dials or touch screens. Exposure controller 40 operates light metering, exposure mode, autofocus and other exposure functions. The system controller 50 manages the graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens and shutter accordingly for subsequent captures. Brightness sensor 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture, the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the image will contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. Because of this flexibility, digital still cameras can have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment that can be selected to reduce the cost, add features, or improve the performance of the camera. For example, an autofocus system is added, or the lens is detachable and interchangeable. It will be understood that the present invention is applied to any type of digital camera or, more generally, digital image capture apparatus, where alternative modules provide similar functionality.

Given the illustrative example of FIG. 1, the following description will then describe in detail the operation of this camera for capturing an image sequence according to the present invention. Whenever general reference is made to an image sensor in the following description, it is understood to be representative of the image sensor 20 from FIG. 1. Image sensor 20 shown in FIG. 1 typically includes a two-dimensional array of light sensitive pixels fabricated on a silicon substrate that convert incoming light at each pixel into an electrical signal that is measured. In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values. The term color pixel will refer to a pixel having a color photoresponse over a relatively narrow spectral band. The terms exposure duration and exposure time are used interchangeably.

As sensor 20 is exposed to light, free electrons are generated and captured within the electronic structure at each pixel. Capturing these free electrons for some period of time and then measuring the number of electrons captured, or measuring the rate at which free electrons are generated, can measure the light level at each pixel. In the former case, accumulated charge is shifted out of the array of pixels to a charge-to-voltage measurement circuit as in a charge-coupled device (CCD), or the area close to each pixel can contain elements of a charge-to-voltage measurement circuit as in an active pixel sensor (APS or CMOS sensor).

Figure 2:
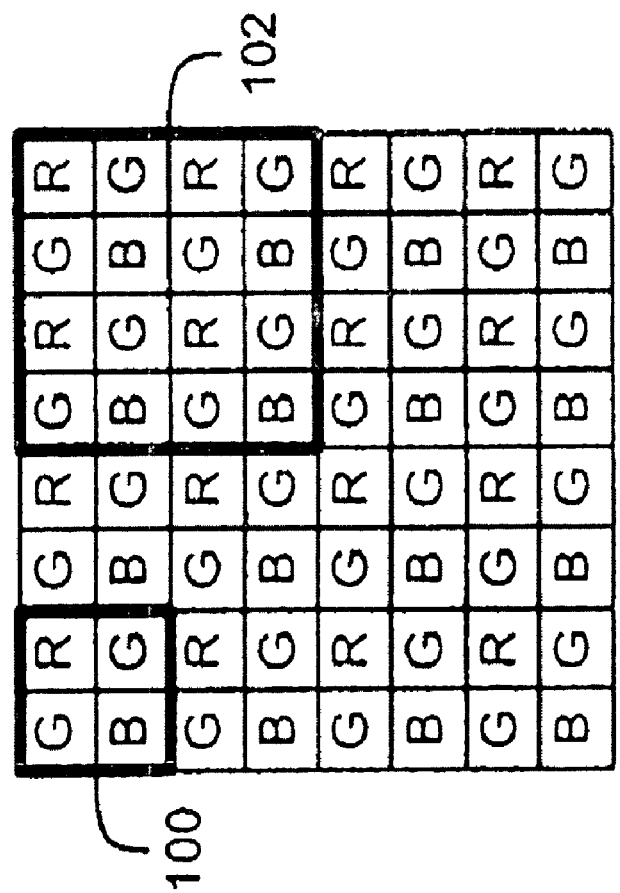
FIG. 2 (prior art) is conventional Bayer color filter array pattern showing a minimal repeating unit and a non-minimal repeating unit.

In order to produce a color image, the array of pixels in an image sensor typically has a pattern of color filters placed over them. FIG. 2 shows a pattern of red (R), green (G), and blue (B) color filters that is commonly used. This particular pattern is commonly known as a Bayer color filter array (CFA) after its inventor Bryce Bayer as disclosed in U.S. Pat. No. 3,971,065. This pattern is effectively used in image sensors having a two-dimensional array of color pixels. As a result, each pixel has a particular color photoresponse that, in this case, is a predominant sensitivity to red, green or blue light. Another useful variety of color photoresponses is a predominant sensitivity to magenta, yellow, or cyan light. In each case, the particular color photoresponse has high sensitivity to certain portions of the visible spectrum, while simultaneously having low sensitivity to other portions of the visible spectrum.

A minimal repeating unit is a repeating unit such that no other repeating unit has fewer pixels. For example, the CFA in FIG. 2 includes a minimal repeating unit that is two pixels by two pixels as shown by pixel block 100 in FIG. 2, which can be expressed as:

$$\begin{array}{cc} G & R \\ B & G \end{array}$$

Multiple copies of this minimal repeating unit are tiled to cover the entire array of pixels in an image sensor. The minimal repeating unit is shown with a green pixel in the upper left corner, but three alternative minimal repeating units can easily be discerned by moving the heavy outlined area one pixel to the right, one pixel down, or one pixel diagonally to the right and down. Although pixel block 102 is a repeating unit, it is not a minimal repeating unit because pixel block 100 is a repeating unit and block 100 has fewer pixels than block 102.

An image captured using an image sensor having a two-dimensional array with the CFA of FIG. 2 has only one color value at each pixel. In order to produce a full color image, there are a number of techniques for inferring or interpolating the missing colors at each pixel. These CFA interpolation techniques are well known in the art and reference is made to the following patents: U.S. Pat. Nos. 5,506,619; 5,629,734; and 5,652,621.

Each pixel of image sensor 20 has both photodetector and active transistor circuitry for readout of the pixel signal. The photo-detector for each pixel in the image sensor array converts photons impinging on the pixel to an electric charge by the photoelectric effect. The charge is integrated over a period of time that is long enough to collect a detectable amount of charge but short enough to avoid saturating storage elements. This integration time period is analogous to a film exposure time (that is, shutter speed).

The timing of image capture can follow one of two basic patterns. In a global capture sequence, all image pixels are simply read at the same time.

However, this type of sequence requires considerable device complexity and can be disadvantageous because it constrains the amount of space on the sensor chip for photoreceptivity. Instead, a row-by-row reading method has been adopted and is often the preferred mode of reading for CMOS APS pixels.

In the image sensor array of a CMOS APS device, the integration time is the time between a reset of a given row and a subsequent read of the row. Since only one row can be selected at a time, the reset/read routine is sequential (i.e. row by row). This reading technique is referred to as a "rolling electronic shutter" or, more simply, "rolling shutter" mode and is well known in the imaging art. A few examples of variations on rolling shutter time sequencing are given in U.S. Pat. No. 6,115,065 entitled "Image Sensor Producing at Least Two Integration Times from Each Sensing Pixel" to Yadid-Pecht et al. and in U.S. Pat. No. 6,809,766 entitled "Look-Ahead Rolling Shutter System in CMOS Sensors" to Krymski et al. The shutter width for the read sequence is the time between integration enable and readout. This can be of variable size depending on the number of adjacent pixels that have the same integration time. The shutter width, having one or more rows read at a time, can also be adjusted by a fixed value to control the gain of an exposed area of a sensor array. As one method for rolling shutter sequencing, a reset pointer is indexed ahead of a read pointer by an amount equal to the shutter width. The time difference between the two pointers corresponds to the pixel integration time. As described above, the shutter width is completely analogous to the width of the physical opening between the two curtains of a mechanical focal plane shutter. In the following, the term exposure duration will be used to correspond to the integration time.

Figure 3A:
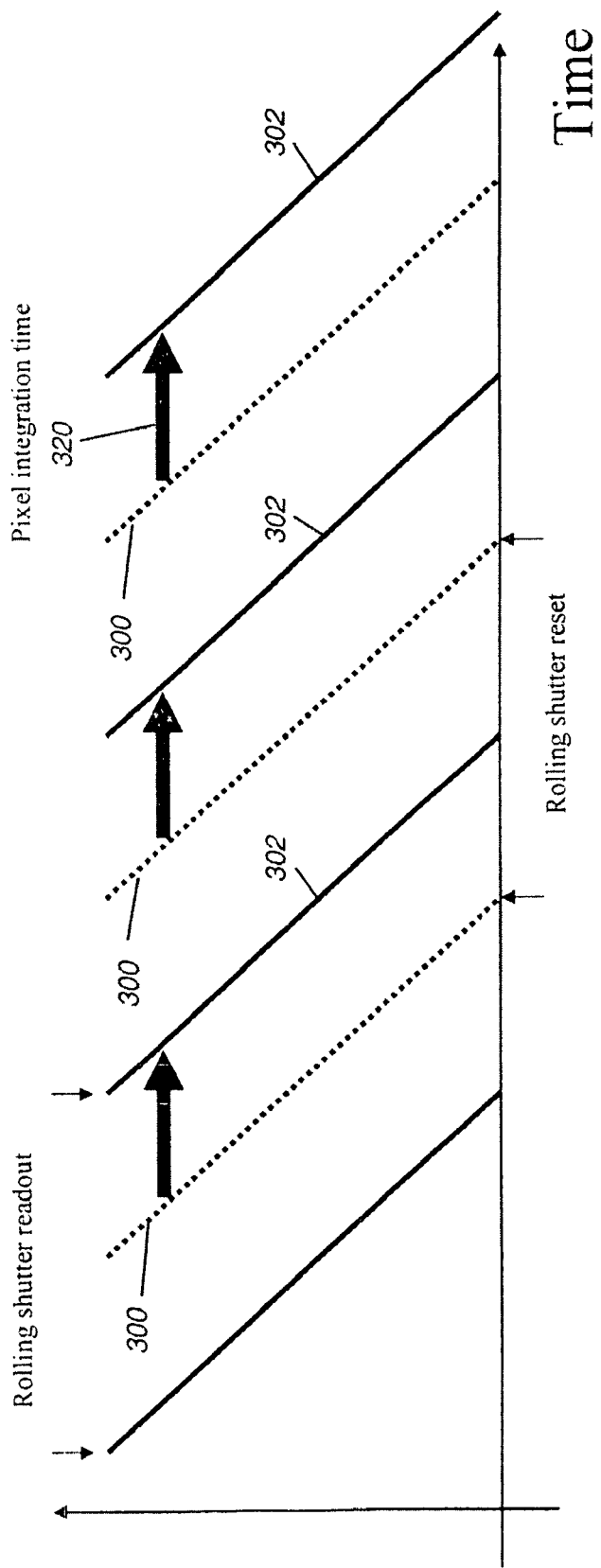
FIGS. 3A and 3B (prior art) show timing diagrams for rolling shutter operation under various light conditions.

FIG. 3A shows a timing sequence for the rolling shutter mode as conventionally used under conditions of relatively good illumination. The abscissa (x-axis) represents time. The ordinate (y-axis) represents rows being read out of the image sensor. Each solid slanted line 302 represents reading out all the rows of the image sensor in sequence starting with the highest numbered rows and proceeding to the lowest numbered rows. (Alternatively, the lines representing readout can be slanted upward from left to right to indicate reading out the rows from lowest numbered rows to highest.) Each dashed line 300 represents resetting all the rows of the image sensor in sequence, again starting with the highest numbered rows and proceeding to the lowest numbered rows, with the entire reset process requiring exactly as much time as the readout process. The delay between a reset process 300 and its immediately following readout process 302 is the integration time for the pixels 320, as indicated by the solid arrows. Note that the integration time is constant for every row read out, but the integration period for each row is time shifted with respect to the preceding and following rows.

Figure 3B:
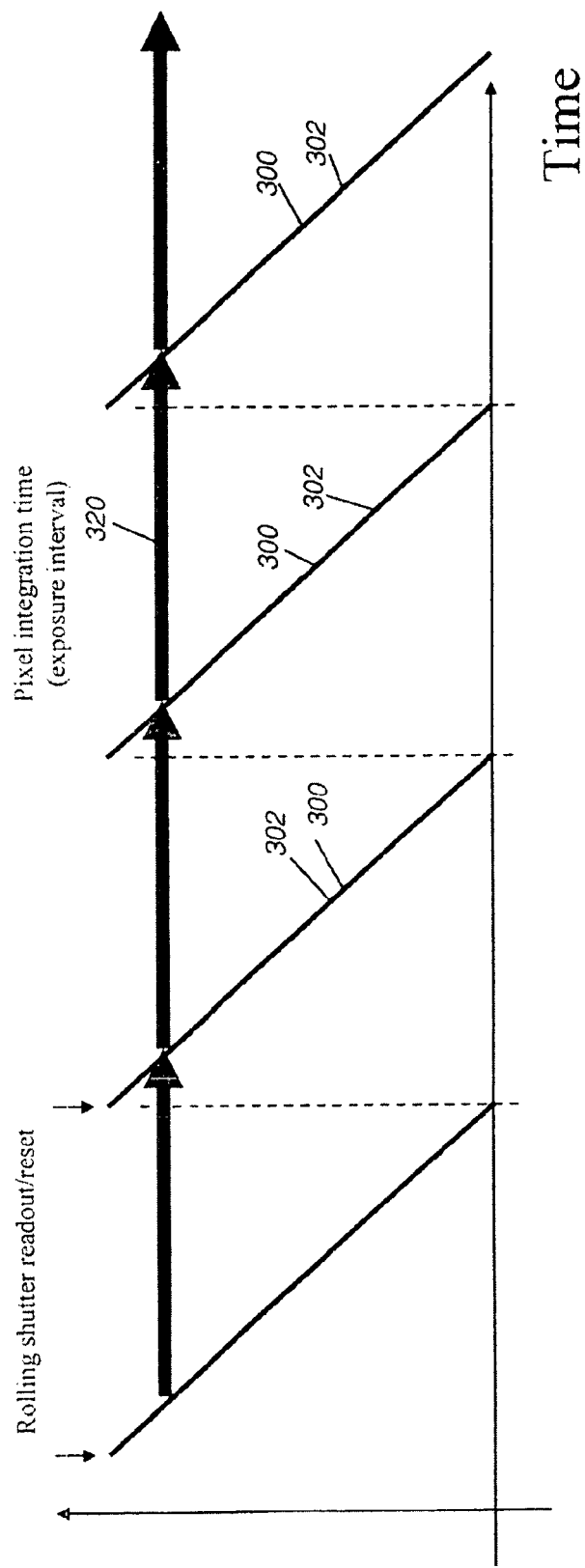

As can be seen from the timing diagram of FIG. 3A, this simple rolling shutter sequence permits periods during which no photons are obtained, specifically, between a read 302 and its immediately following reset 300. Although this can be acceptable under good illumination, this arrangement cannot perform well under low-light conditions. This is because more pixel integration time can be needed as light intensity decreases. The timing diagram of FIG. 3B shows a timing sequence for low-light conditions wherein the reset 300 is performed immediately following or coincident with read 302. As a result, the pixel integration time 320 has been increased to fill the time between successive reads and very few photons are wasted.

Even with the adoption of rolling shutter techniques, however, the task of reading the image sensor efficiently still has its shortcomings Shear motion artifacts are one type of problem. Relative motion between the scene (or elements of the scene) and the image sensor causes objects within the scene to appear distorted in the image captured by the image sensor. This effect, termed image "shear", is characteristic of rolling shutter arrangements. For example, if such a so-called rolling shutter or electronic focal plane shutter image sensor is used to capture an image of a car moving horizontally, the car moves relative to the image sensor as each row of the captured image is exposed and read out, so each row of the captured image shows the car at a different position. This can cause the round tires of the car to appear oval, and the car's rectangular windows to appear to be parallelograms. This distortion is a direct consequence of the amount of time required to read out all the rows of the image sensor. Low-light performance can still be improved and image dynamic range can still be less than what is desired.

One type of solution that has been proposed is the use of some portion of sensor array pixels as panchromatic pixels. For example, commonly assigned U.S. Patent Application No. 2007/0024931 entitled "Image Sensor with Improved Light Sensitivity" by Compton et al. discloses an image sensor having both color and panchromatic pixels. In the context of the present disclosure, the term panchromatic pixel refers to a pixel having a generally panchromatic photo-response, with a wider spectral sensitivity than the narrower spectral sensitivities represented in the selected set of color photo-responses. That is, a panchromatic pixel can have high sensitivity to light across the entire visible spectrum. Although the panchromatic pixels generally have a wider spectral sensitivity than the set of color photo-responses, each panchromatic pixel can also have an associated filter. Such filter can be either a neutral density filter or a color or bandwidth filter.

Figure 4:
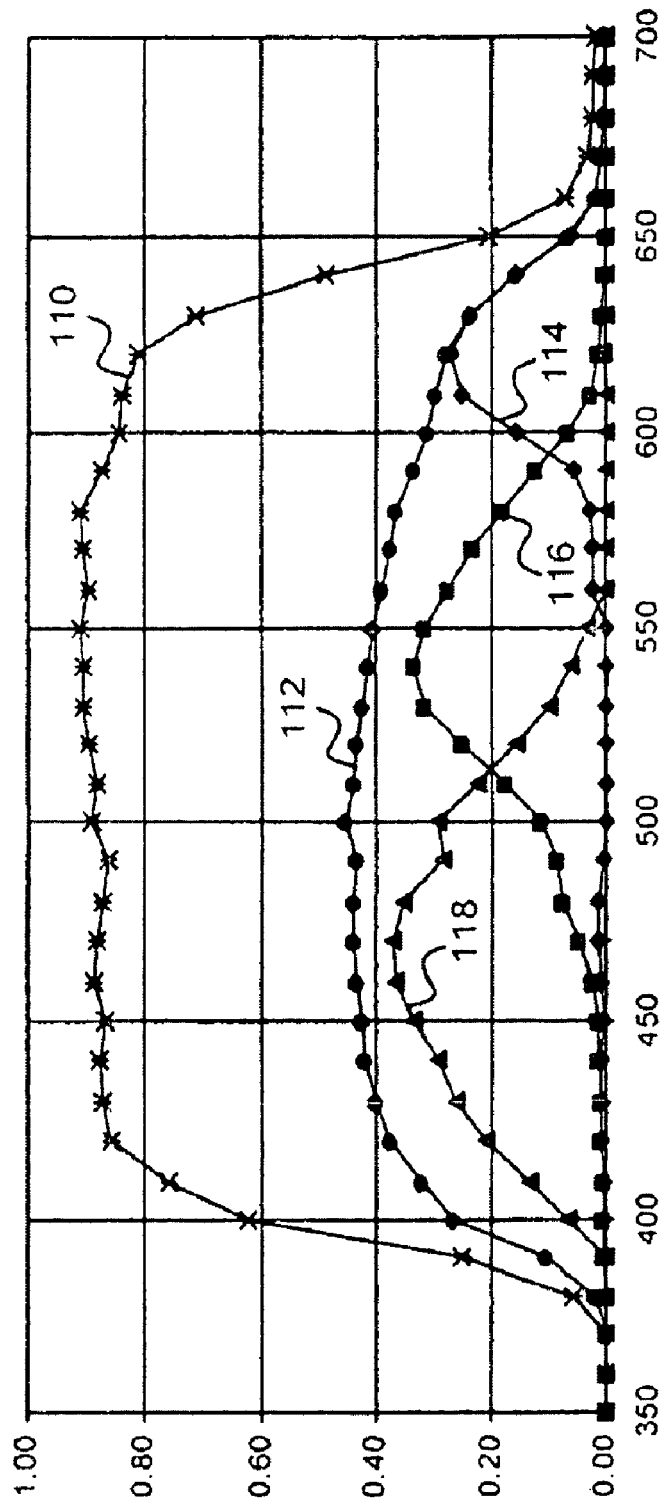
FIG. 4 (prior art) provides representative spectral quantum efficiency curves for red, green, and blue pixels, as well as a wider spectrum panchromatic quantum efficiency, all multiplied by the transmission characteristics of an infrared cut filter.

Referring to the graph of FIG. 4, there are shown the relative spectral sensitivities of pixels with red, green, and blue color filters in a typical camera application. The X-axis in FIG. 4 represents light wavelength in nanometers, spanning wavelengths approximately from the near ultraviolet to near infrared, and the Y-axis represents efficiency (normalized). In FIG. 4, curve 110 represents the spectral transmission characteristic of a typical bandwidth filter used to block infrared and ultraviolet light from reaching the image sensor. Such a filter is needed because the color filters used for image sensors typically do not block infrared light, hence the pixels can be unable to distinguish between infrared light and light that is within the pass bands of their associated color filters. The infrared blocking characteristic shown by curve 110 thus prevents infrared light from corrupting the visible light signal. The spectral quantum efficiency, i.e. the proportion of incident photons that are captured and converted into a measurable electrical signal, for a typical silicon sensor with red, green, and blue filters applied is multiplied by the spectral transmission characteristic of the infrared blocking filter represented by curve 110 to produce the combined system quantum efficiencies represented by curve 114 for red, curve 116 for green, and curve 118 for blue. It is understood from these curves that each color photo-response is sensitive to only a portion of the visible spectrum. By contrast, the photo-response of the same silicon sensor that does not have color filters applied (but including the infrared blocking filter characteristic) is shown by curve 112; this is an example of a panchromatic photo-response. By comparing the color photo-response curves 114, 116, and 118 to the panchromatic photo-response curve 112, it is clear that the panchromatic photo-response can be three to four times more sensitive to wide spectrum light than any of the color photo-responses. In rolling shutter mode, image sequences are typically read as illustrated in FIGS. 3A and 3B. The entire image sensor is read and this constitutes one image in the image sequence. Subsequently, the entire image sensor is read again, and this constitutes the next image in the image sequence. Alternatively, as described in U.S. patent application Ser. No. 11/780,523, the image sensor is partitioned into disjoint subsets, and these subsets are read in some relative order.

Figure 5:
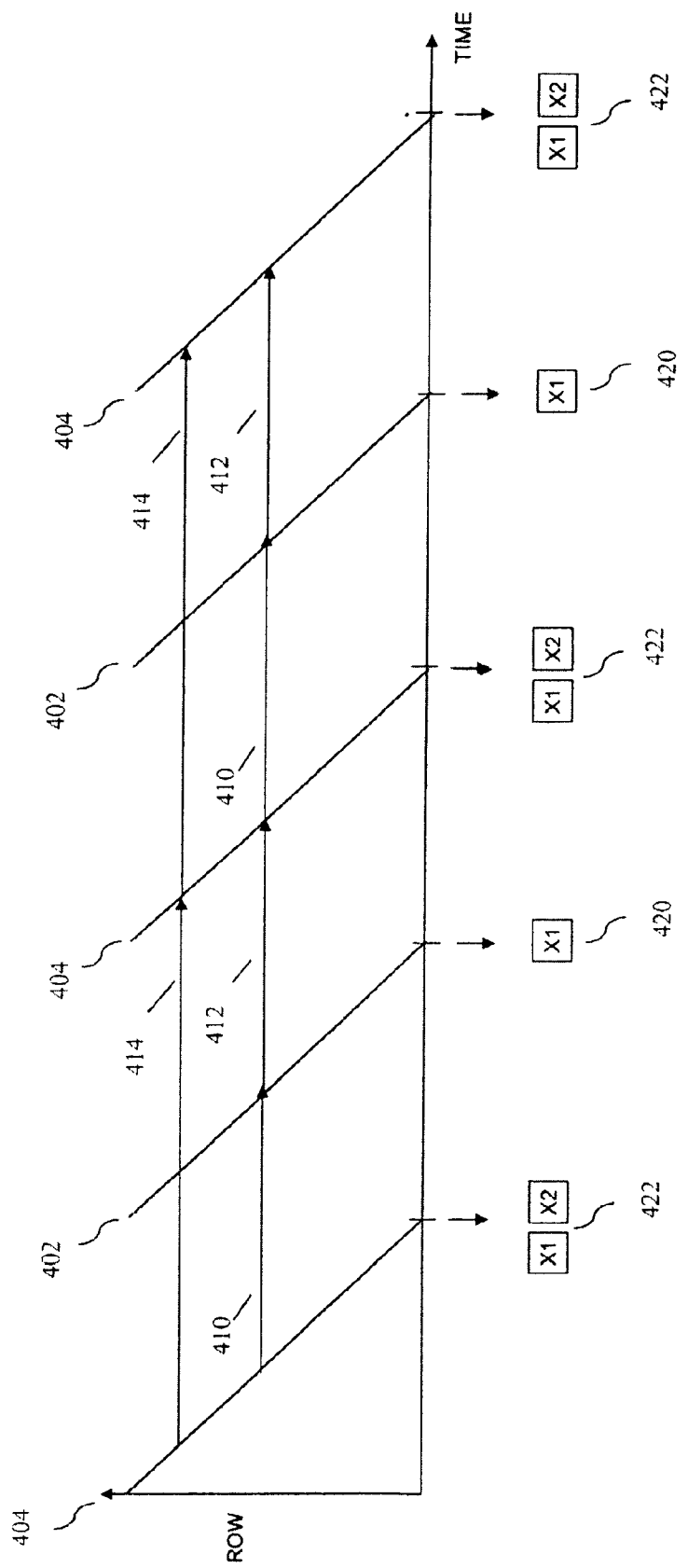
FIG. 5 illustrates a timing diagram for an embodiment of the current invention.

FIG. 5 shows a timing sequence for the rolling shutter mode for a preferred embodiment of the present invention wherein an image sensor array has at least two groups of pixels wherein the number of pixels of any group has no less than one-quarter of the number of pixels of the portion of the entire sensor that produces the digital image and wherein the pixels of each group are uniformly distributed over the sensor. The rolling shutter read time given by 404 represents a readout of pixel signals 422 of all of the pixels of the image sensor wherein a first group of pixels (X1) and a second group of pixels (X2) can be read out individually or binned. The pixels can be reset 404 after they are read. The X1 pixels are readout and reset according to the rolling shutter read time given by 402. The overall exposure for each X1 pixel is shown by line 410, which represents the time between the reset and read of the X1 pixels for each row of the image sensor. Pixel signals 420 represent a read out of all of the X1 pixels. The read pattern repeats at this stage, as the next readout is of the entire image sensor according to the rolling shutter read time given by 404. The X1 pixels have been read out more than once. Some of the pixels readouts at 404 have a shorter exposure given by line 412, while other pixels have a longer exposure given by line 414. As a result, every photon that can reach the sensor can be utilized.

Those skilled in the art will recognize that there are many alternative methods to the present invention. The pixels can be binned or readout individually. More than two groups of pixels can be used to have multiple exposure times. There can be a delay between the readout process and the reset process for any group of pixels. The following preferred embodiments will detail some of these alternative methods.

Figure 6:
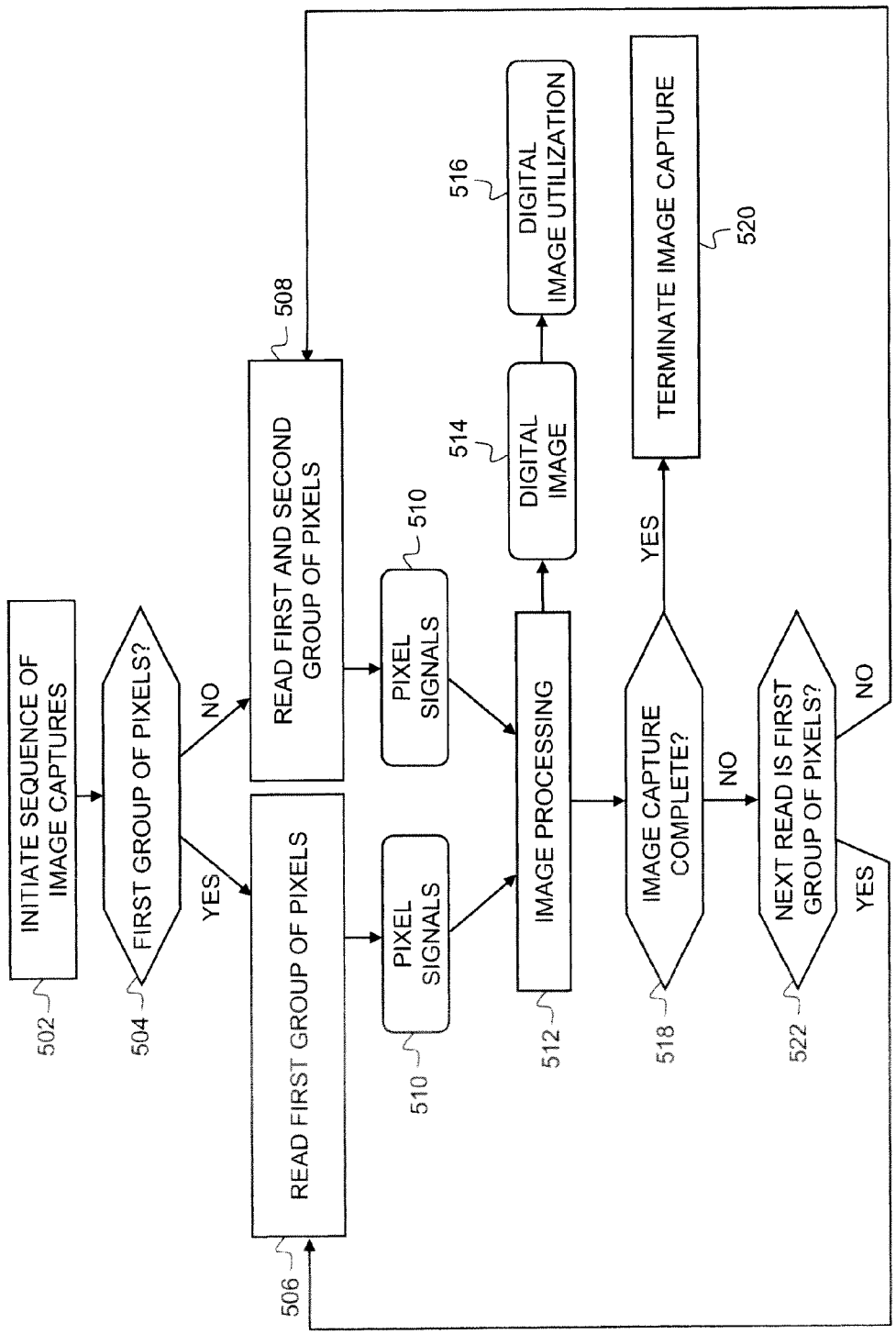
FIG. 6 is a flow diagram showing an embodiment of the current invention.

FIG. 6 is a high-level flow chart of a preferred embodiment of the present invention. Initially a digital camera such as described in FIG. 1 initiates a sequence of image captures 502 by exposing the image sensor array 20 to scene light. The image sensor stage 28 in FIG. 1 controls the process of selecting and reading pixels. The first time pixel signals are read from the sensor 504 through the analog signal processor 22, they produce a first set of pixel signals 510. The first set of pixel signals 510 can be from the first group of pixels, or they can be from the first and second group of pixels. If the first read is the first group of pixels, all of the first groups of pixels are read from the sensor 506. If the first read is the first and second group of pixels, all of the second group of pixels is read and the first group of pixels are read from the image sensor 508. The image sensor continues to be exposed until the capture process is terminated. The read process continues in a similar manner to the first read for subsequent readouts from the sensor. For example, the second time pixel signals are read from the sensor, they produce a second set of pixel signals 510. The second set of pixel signals 510 can be from the first group of pixels or from the first and second group of pixels. If the second read is from the first group of pixels, all first group of pixels are read again from the sensor 506. If the second read is from the first and second group of pixels, all of the second group of pixels are read and the first group of pixels are read again from the image sensor 508.

After the pixel signals 510 are read from the sensor, an image processing step 512 operates on available pixel signals to generate a digital image 514. This process can be performed by the digital signal processor 36 in FIG.1. The image processing step 512 can utilize pixel signals from the current readout as well as data buffered in memory 32 from previous sensor readouts. The digital image 514 generated can correspond to the current sensor readout, or a previous sensor readout, or any combination of current and previous sensor readouts.

Relative to the pixel signals obtained from a given sensor readout, the digital image 514 can have greater spatial resolution, improved image quality, improved color information, or other enhancements. The sequence of digital images can also have greater temporal resolution than achievable simply by reading the sensor at the target spatial resolution. The digital image 514 is passed to a digital image utilization function 516. This function can represent an encoding process, by which the digital image 514 is encoded into a video bitstream. It can represent a display function by which the digital image 514 is produced on a display. It can represent a printing function, by which the digital image 514 is printed. It can also represent a sharing function by which the digital image 514 is shared with other devices. The aforementioned are examples of how the digital image 514 can be utilized, and are not limiting.

If the sequence of image captures is complete 518, the capture process is terminated 520. Otherwise, the capture process assesses whether the next read from the sensor 522 is first group of pixels or first and second group of pixels and the readout and processing loop is iterated until the capture process is completed.

The proposed invention is capable of being used with an image sensor with any color filter array pattern. The proposed invention is also capable of being used with an image sensor using only panchromatic pixels. In a preferred embodiment, however, the image sensor has both panchromatic pixels and color pixels. The panchromatic pixels are the first group of pixels and color pixels are the second group of pixels. In the proposed invention, an image sequence is captured by alternately reading all panchromatic pixels and reading color pixels and reading again the panchromatic pixels.

Figure 7:
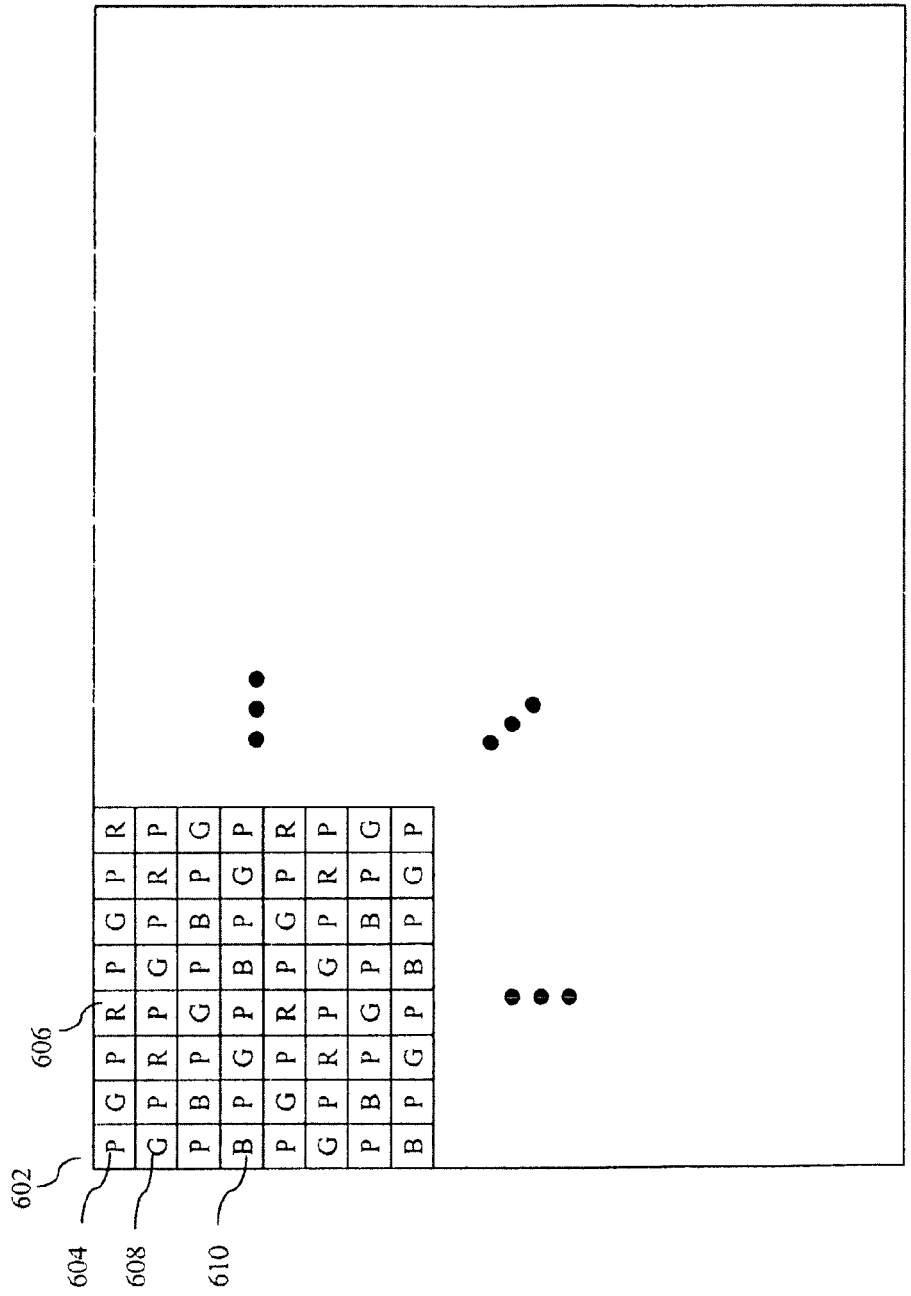
FIG. 7 (prior art) is a diagram showing an example color filter array pattern containing panchromatic and color pixels.

The method of the present invention is described with respect to the color filter array pattern illustrated in FIG. 7. FIG. 7 illustrates an example color filter array pattern 602 for a preferred embodiment of the present invention. In this example, approximately one-half of the pixels are panchromatic 604, while the other one-half are color pixels split among red (R) 606, green (G) 608 and blue (B) 610. The color filter array pattern 602 has a minimal repeating unit containing 16 pixels in the following 4 by 4 array:

P G P R

G P R P

P B P G

B P G P.

Those skilled in the art will recognize that other color filter array configurations and minimal repeating units are possible within the scope of the present invention.

Pixels can be combined and these combined pixels can be read out. In a preferred embodiment, pixel combination is achieved through pixel binning Various pixel binning schemes can be used during readout of the image sensor, as illustrated in FIG. 8. In FIG. 8, two partial rows 701, 702 of an image sensor are displayed. In this example, the underlying readout circuitry for a sensor array uses a floating diffusion 704 that is switchably connected to one or more surrounding pixels at a time. Implementation and use of the floating diffusion is well known to those skilled in the digital image acquisition art. FIG. 8 shows a conventional arrangement in which each floating diffusion 704 serves four surrounding pixels, shown in one example as a quartet 706.

Pixel signals can be switched to floating diffusion 704 in any of a number of combinations. In a readout combination 708, each pixel in quartet 706 has its charge transferred separately to floating diffusion 704 and thus is read individually. In a readout combination 710, panchromatic pixels P are binned, that is, share floating diffusion 704 by emptying their stored charge to floating diffusion 704 at the same time; similarly, both color (G) pixels in the quartet are binned, switching their signals at the same time to floating diffusion 704. In this binning scheme, panchromatic pixels are only combined with other panchromatic pixels, and color pixels are only combined with other color pixels. In another readout combination 712, panchromatic pixels P are not binned, but are read separately; here color pixels (G) are binned. In another readout combination 714, all four pixels connected to the given floating diffusion unit are binned simultaneously. In this binning scheme, panchromatic pixels are combined with both color pixels and other panchromatic pixels. Color pixels are combined with both panchromatic pixels and other color pixels.

Figure 9:
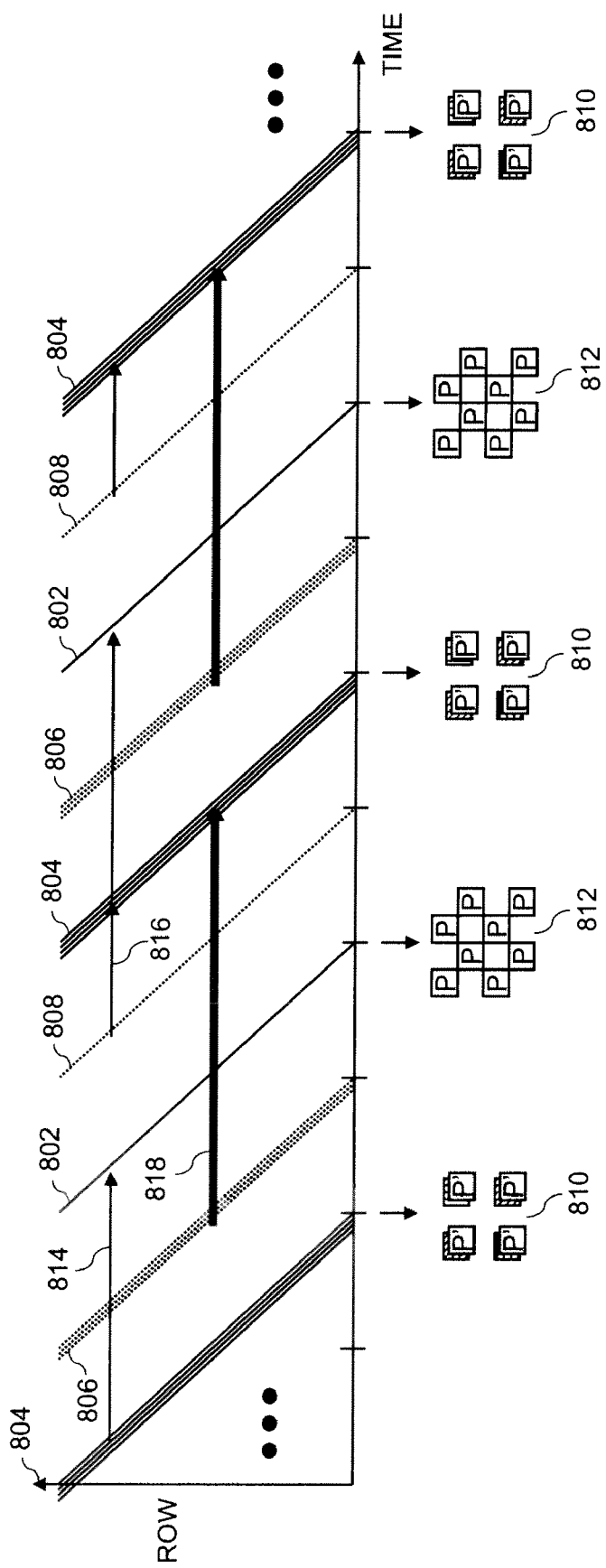
FIG. 9 is a timing diagram showing rolling shutter operation for panchromatic and color pixels in one embodiment of the current invention.

FIG. 9 illustrates the readout pattern for an image sensor according to a preferred embodiment of the present invention. This figure is based on an image sensor with the color filter array pattern shown in FIG. 7, and utilizing a rolling shutter readout. In FIG. 9, several consecutive readouts of pixel signals are shown. This collection of pixel signals represents a portion of an overall image capture process. The entire image capture process can contain additional readouts of pixel signals extending in either direction along the time axis. Readout 804 represents a readout of all of the pixels of the image sensor corresponding to a combination of color pixels and panchromatic pixels. For each quartet of pixels connected to a floating diffusion unit, the two color pixels are binned and read as a single value. The two panchromatic pixels are also binned separately and read as a single value. Combined they give pixel signals 810 corresponding to a binned panchromatic/binned color readout. The pixels can be reset 804 after they are read. Each floating diffusion unit is accessed twice during the course of the sensor readout.

The color pixels are also reset according to rolling shutter reset time given by 806. The panchromatic pixels are read out and reset according to the rolling shutter time given by 802. The overall exposure for each panchromatic pixel is shown by the line 814, which represents the time between the reset and read of the panchromatic pixels for each row of the image sensor. The panchromatic pixels are readout without any binning to produce pixel signals 812, such that the each floating diffusion unit is accessed twice during the overall readout of the panchromatic pixels. Thus the readout of panchromatic pixels 802 and the readout of a combination of panchromatic pixels and color pixels 804 have the same readout rate and same motion shear properties. This design is advantageous not just for motion shear, but also for minimizing unused light while maintaining equal exposure duration for all panchromatic pixels, as well as equal exposure duration for all color pixels.

The panchromatic pixels are again reset according to the rolling shutter reset time given by 808. The read pattern repeats at this stage, as the next readout is of the entire image sensor according to the rolling shutter read time given by 804. The panchromatic pixels readout at 804 has a shorter exposure given by 816, while the color pixels have a longer exposure given by 818. Techniques for combining panchromatic pixels with relatively shorter exposure and color pixels with relatively longer exposure are described by U.S. patent application Ser. No. 12/258,389, filed Oct. 25, 2008 which is included herein by reference.

In FIG. 9, the panchromatic pixels are exposed for a different duration prior to an unbinned readout as they are prior to a binned readout. In particular, the panchromatic pixels are exposed for approximately half as long prior to a binned readout as they are prior to an unbinned readout. This is an advantageous feature of the present invention, as the panchromatic pixel signals are exposure balanced, such that the charge read from the floating diffusion unit corresponding to panchromatic pixels is approximately equal whether binned at a shorter exposure duration or unbinned at a longer exposure duration. In FIG. 9, the exposure of the panchromatic pixels prior to a panchromatic pixel readout partially overlaps the exposure of the color pixels prior to the following readout of the color pixels.

Figure 10:
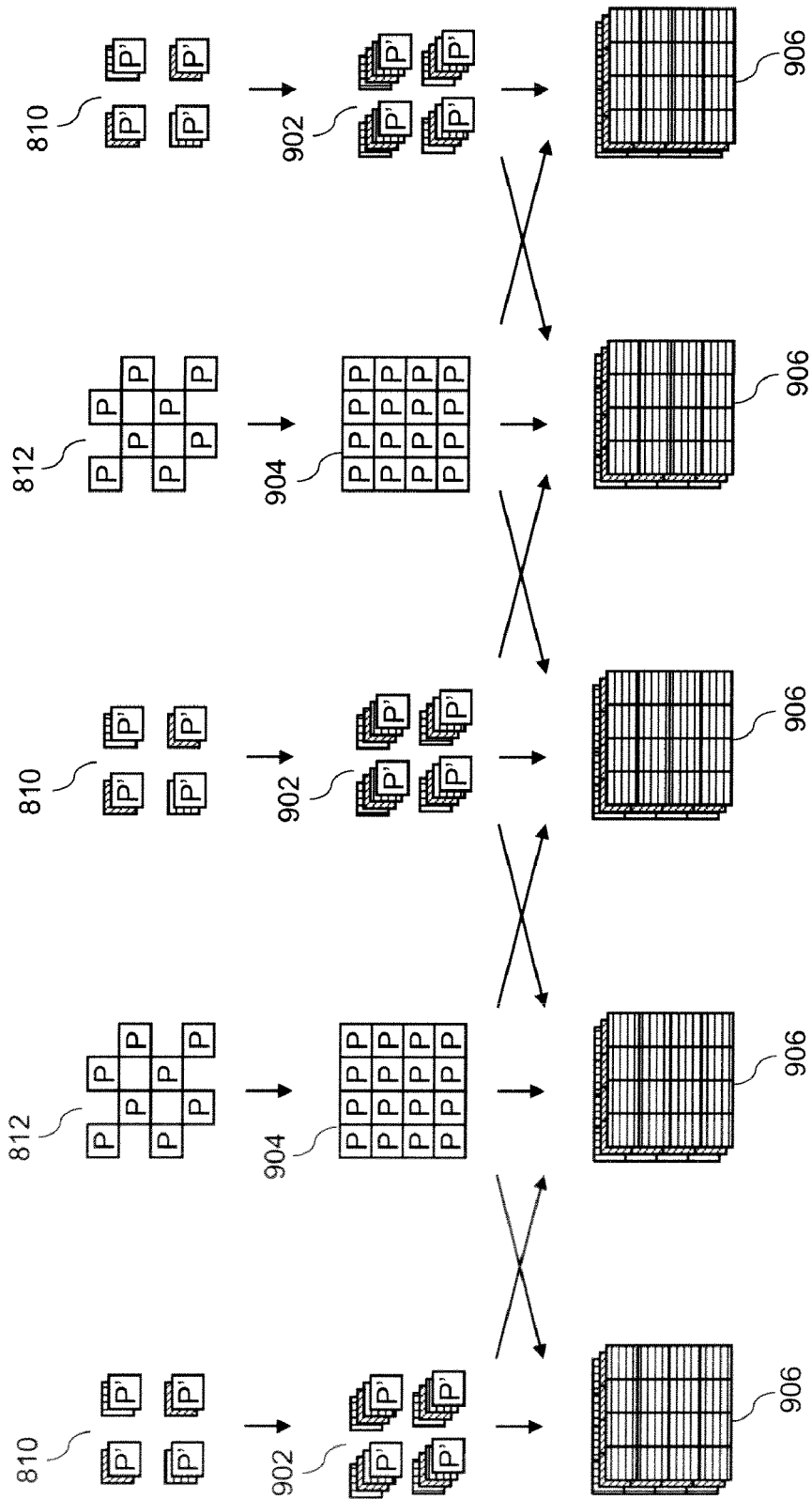
FIG. 10 is a diagram showing the generation of digital images at approximately the spatial resolution of the sensor from readouts of panchromatic pixels and from readouts of binned panchromatic and binned color pixels.

FIG. 10 describes in greater detail one method of image processing 512 after each readout of pixel signals is completed. Pixel signals that are a combination of binned color pixels and binned panchromatic pixels 810 can be color-interpolated from this initial color filter array data to generate quarter-resolution color images 902. Panchromatic pixel signals 812 can be spatially interpolated to generate sensor-resolution panchromatic images 904. A digital image 906 at the spatial resolution of the image sensor is generated corresponding to each readout. Corresponding to readouts of panchromatic pixel signals 812, a sensor-resolution, digital image 906 is generated using data from the sensor-resolution panchromatic image 904 as well as quarter-resolution color images 902 from the previous and subsequent readouts of panchromatic and color pixel signals 810. Corresponding to readouts that are a combination of panchromatic and color pixel signals 810, a sensor-resolution, digital image 906 is generated using data from the quarter-resolution color image 902 as well as sensor-resolution panchromatic images 904 from the previous and subsequent readouts of panchromatic pixel signals 812. This scheme requires some buffering. Three readouts are used in the formation of each digital image 906.

The proposed invention allows the generation of an image sequence of digital images 906 with high spatial resolution, high temporal resolution, and high image quality. For image sequence capture according to prior methods, an image sequence of high spatial resolution is generated by reading the entire sensor repeatedly. The time required to readout the full sensor is longer than the time required to readout either binned panchromatic and binned color pixel signals 810 or panchromatic pixel signals 812. Thus the temporal resolution, that is the frame rate, of such an image sequence is lower than achieved using the proposed invention.

Figure 11:
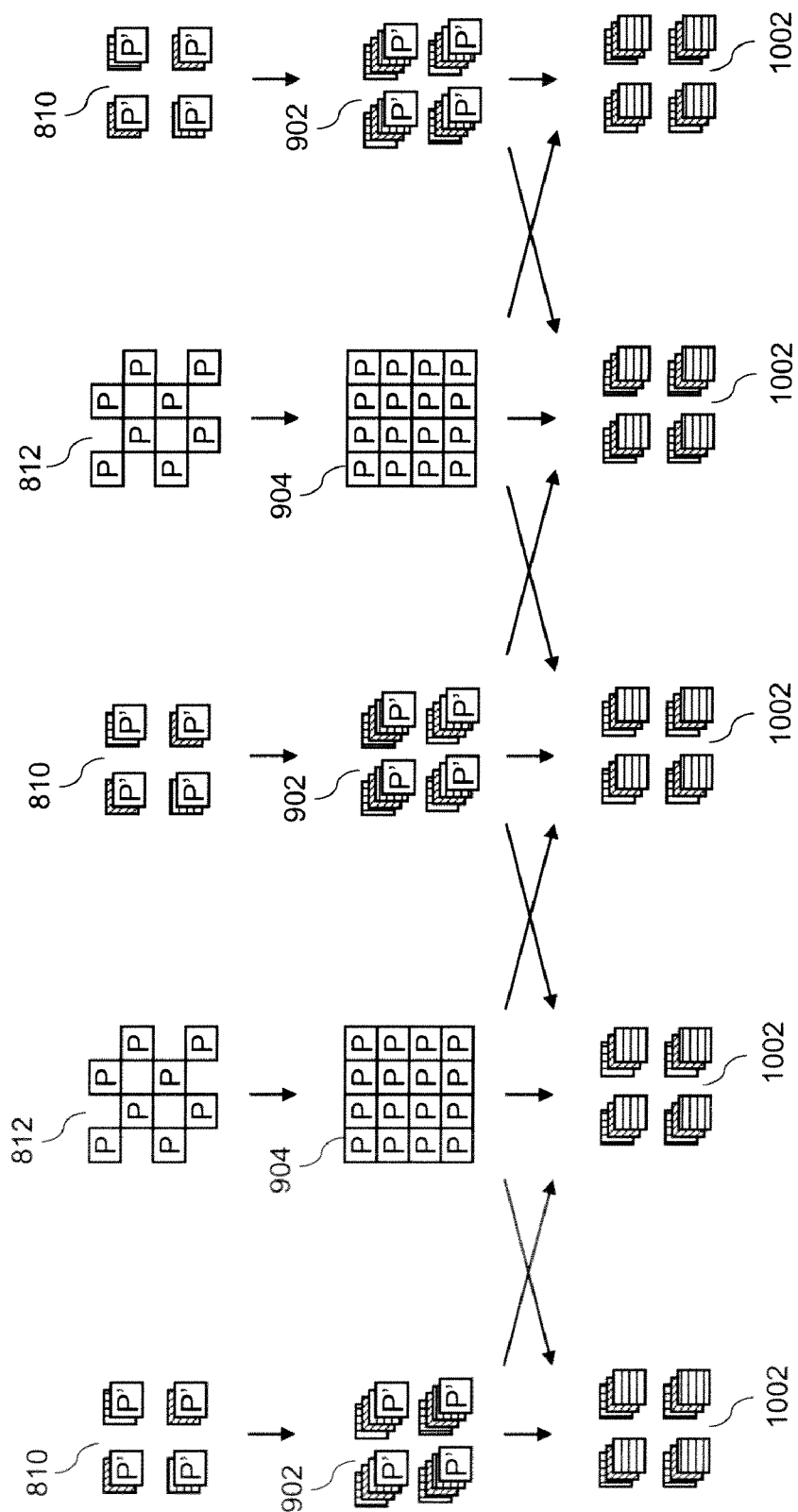
FIG. 11 is a diagram showing the generation of digital images at approximately one half the horizontal and one half the vertical spatial resolution of the sensor from readouts of panchromatic pixels and from readouts of binned panchromatic and binned color pixels.

FIG. 11 describes in greater detail another method of image processing 512 after each readout of pixel signals is completed. Pixel signals 810 that are a combination of binned color pixels and binned panchromatic pixels can be color-interpolated from this initial color filter array data to generate quarter-resolution color images 902. Panchromatic pixel signals 812 can be spatially interpolated to generate sensor-resolution panchromatic images 904. A digital image 1002 at one quarter the spatial resolution of the sensor—one-half the horizontal resolution and one-half the vertical resolution—is generated corresponding to each readout. Corresponding to panchromatic pixel signals 812, an enhanced quarter-resolution digital image 1002 is generated using data from the sensor-resolution panchromatic image 904 as well as quarter-resolution color images 902 from the previous and subsequent readouts of panchromatic and color pixel signals. Corresponding to readouts that are a combination of panchromatic and color pixel signals 810, an enhanced quarter-resolution digital image 1002 is generated using data from the quarter-resolution color image 902 as well as sensor-resolution panchromatic images 904 from the previous and subsequent panchromatic pixel signals 812. This scheme requires some buffering. Three readouts are used in the formation of each digital image 1002.

The proposed invention allows the generation of an image sequence of digital images 1002 with improved spatial resolution, high temporal resolution, and high image quality. For image sequence capture according to prior methods, an image sequence of quarter-resolution images can be generated by binning or sub-sampling and reading the sensor repeatedly. In order to read out the image sequence at a high temporal resolution, each readout is binned or sub-sampled to one quarter the resolution of the sensor. Thus the spatial resolution of the image sequence is limited. In the proposed invention, readouts of panchromatic pixel signals 812 have the spatial resolution of the sensor, and thus improved high spatial frequency information can be maintained in the digital images 1002. Additionally, in the proposed method color pixels can have exposure durations longer than the inverse of the frame rate. In image sequence capture according to prior methods, this is not possible since each readout is a full sensor readout. Extended color pixel exposure duration allows improved signal to noise ratios to be obtained for color pixels and improves the overall image quality of the digital images.

Figure 12:
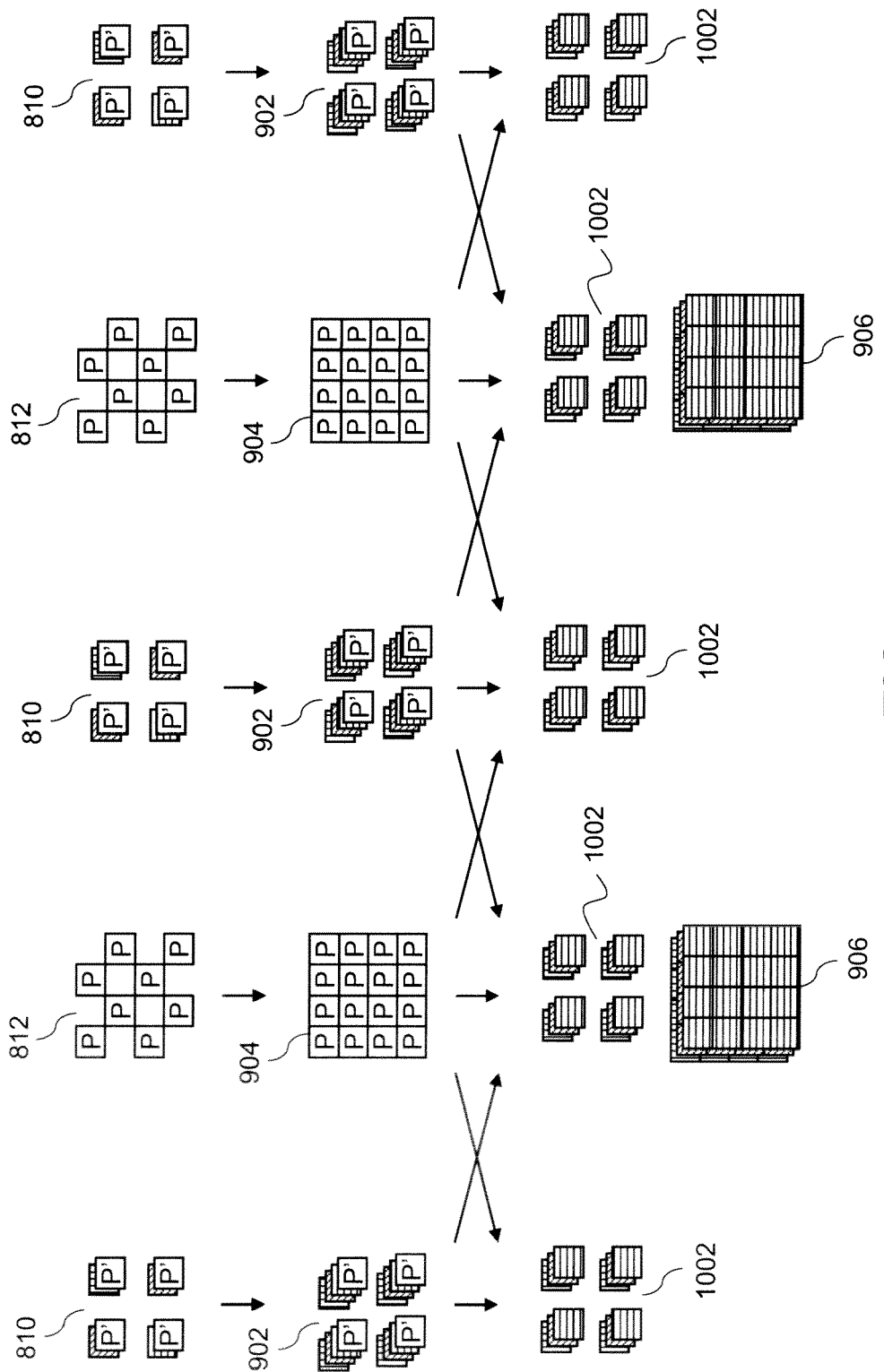
FIG. 12 is a diagram showing the generation of digital images at approximately one half the horizontal and one half the vertical spatial resolution of the sensor as well as digital images at approximately the spatial resolution of the sensor from readouts of panchromatic pixels and from readouts of binned panchromatic and binned color pixels.

FIG. 12 describes in greater detail another method of image processing 512 after each readout of pixel signals is completed. Pixel signals that are a combination of binned color pixels and binned panchromatic pixels 810 can be color-interpolated from this initial color filter array data to generate quarter-resolution color images 902. Panchromatic pixel signals 812 can be spatially interpolated to generate sensor-resolution panchromatic images 904. Corresponding to panchromatic pixel signals 812, both an enhanced quarter-resolution (one-half horizontal spatial resolution, one-half vertical spatial resolution), digital image 1002 as well as an enhanced sensor-resolution digital image 906 are generated using data from the sensor-resolution panchromatic image 904 as well as quarter-resolution color images 902 from the previous and subsequent readouts of panchromatic and color pixel signals 810. Corresponding to readouts of panchromatic and color pixel signals 810, an enhanced quarter-resolution digital image 1002 is generated using data from the quarter-resolution color image 902 as well as sensor-resolution panchromatic images 904 from the previous and subsequent panchromatic pixel signals 812. This scheme requires some buffering. Three readouts are used in the formation of each quarter-resolution digital image 906 or sensor-resolution digital image 1002.

The proposed invention allows the simultaneous generation of a low spatial resolution, high frame rate image sequence as well as a high spatial resolution, low frame rate image sequence. Thus it is possible to capture simultaneously both a low resolution image sequence as well as a high resolution, high quality still image. Prior solutions for simultaneously capturing an image sequence and a still image typically require additional hardware, or must disrupt the image sequence capture to acquire the still image.

Figure 13:
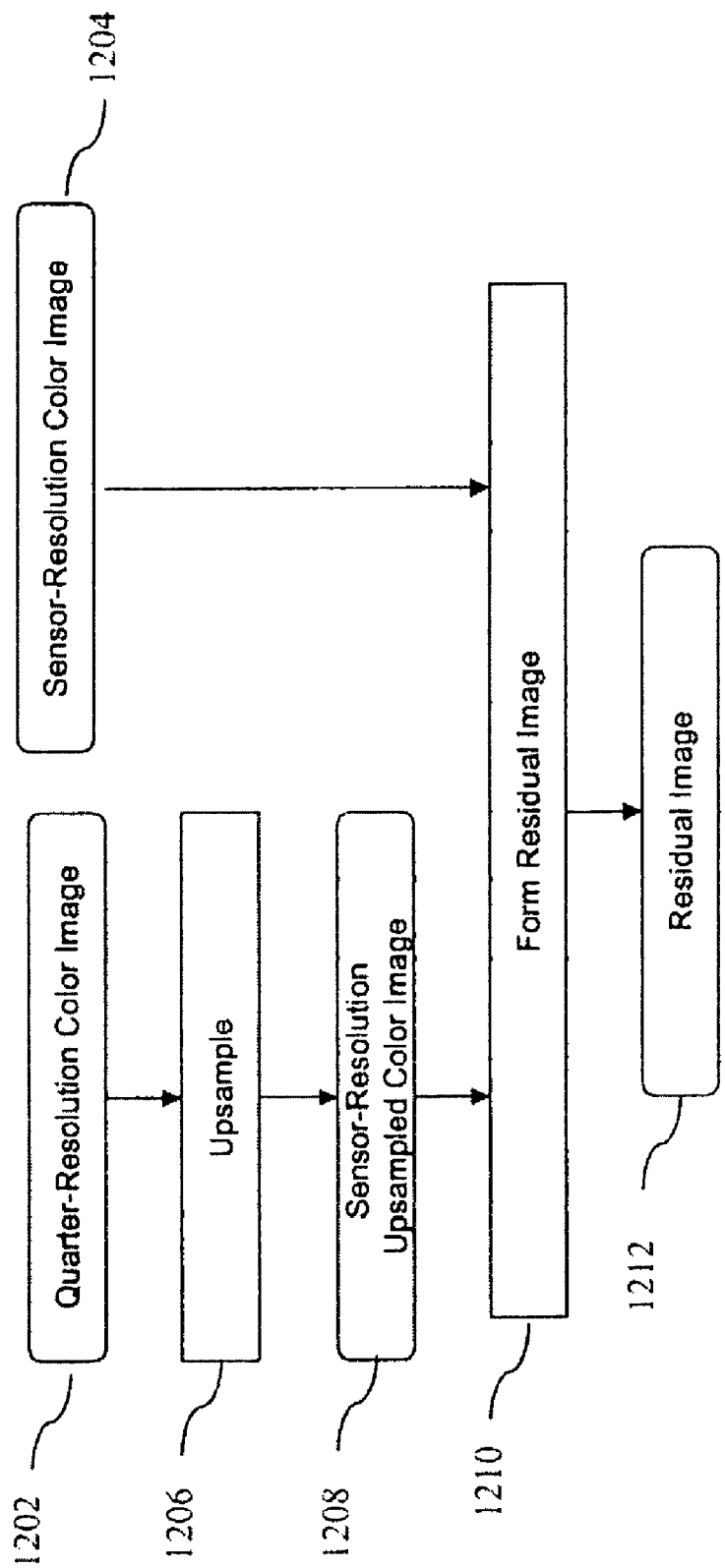
FIG. 13 is a flow diagram showing the generation of a residual image.

For the image processing 512 described in FIG. 12, there are multiple options how to treat the digital images 514. In one method, the quarter-resolution color images 902 are treated as a first sequence, and the sensor-resolution color images are treated as an independent second sequence, and the two sequences are stored as separate sequences. FIG. 13 illustrates an alternative method for handling the quarter-resolution and sensor-resolution digital images 514. A quarter-resolution color image 1202 is up-sampled in an up-sampling block 1206 to produce a sensor-resolution up-sampled color image 1208. A residual image 1212 is formed in a residual image formation block 1210 by subtracting the sensor-resolution up-sampled color image 1208 from the sensor-resolution color image 1204. This residual image 1212 is stored as well as the quarter-resolution color image 1202. The two images can be stored separately or combined. In one example, quarter-resolution color images 1202 can be stored using a compression syntax and file format such as the JPEG compression standard and TIFF file format, and the residual image 1212 can be stored as metadata within the file. In another example, quarter-resolution color images 1202 can be stored using a compression syntax and file format such as the MPEG compression standard and Quicktime.MOV file format, and the residual images 1212 can be stored as metadata within the file. File readers can ignore the metadata and just decode the quarter-resolution color images. Intelligent file readers can extract the metadata as well and reconstruct the sensor-resolution color images.

Figure 14:
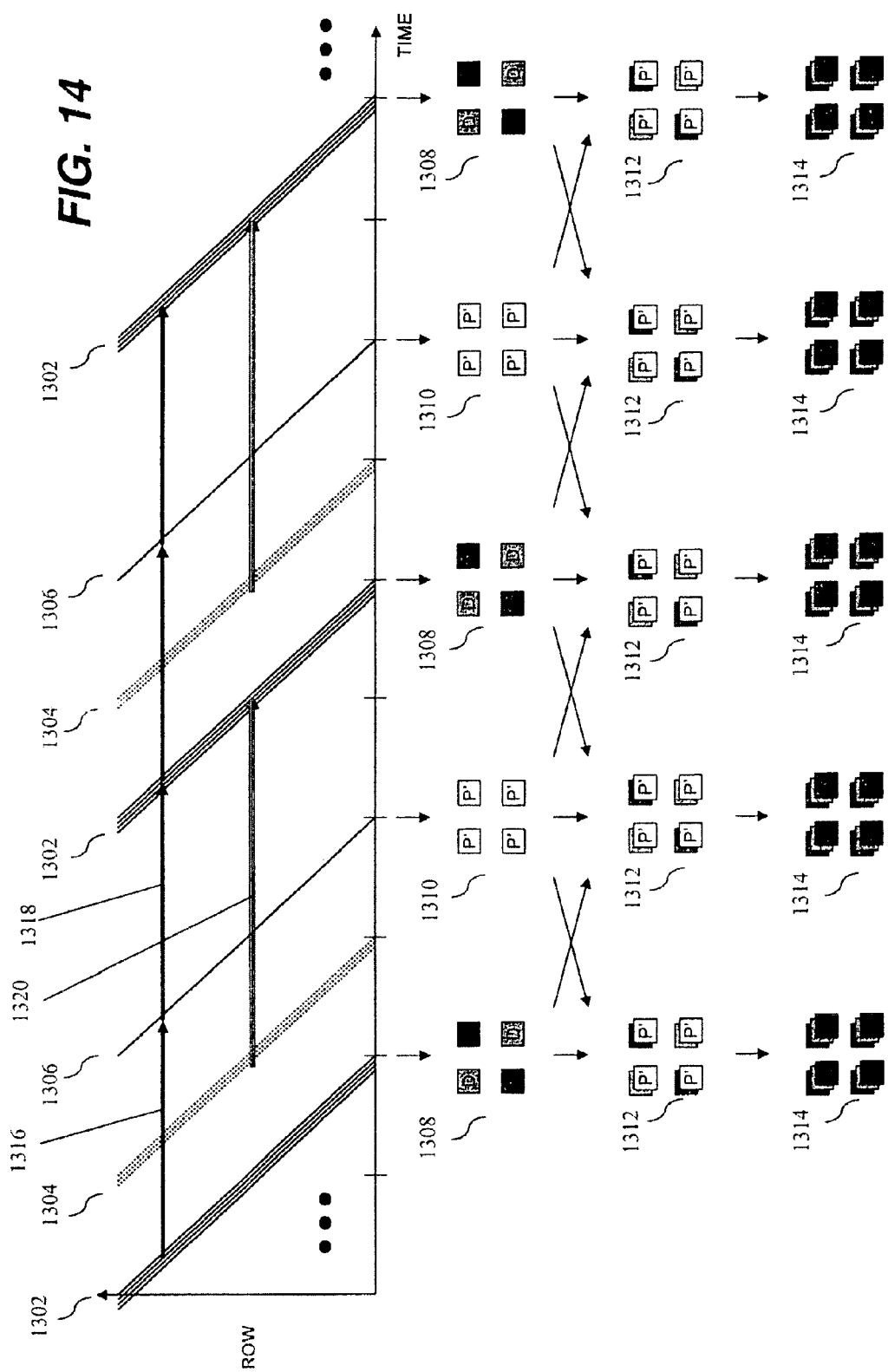
FIG. 14 is a diagram showing the generation of digital images at approximately one half the horizontal and one half the vertical spatial resolution of the sensor from readouts of binned panchromatic pixels and from readouts of panchromatic and color pixels binned together.

FIG. 14 illustrates the readout pattern and image generation for an image sensor according to another preferred embodiment of the present invention. This figure is based on an image sensor with the color filter pattern shown in FIG. 7, and utilizing a rolling shutter readout. In FIG. 14, several consecutive readouts are shown. This collection of pixel signals represents a portion of an overall image capture process. The entire image capture process can contain additional readouts of pixel signals extending in either direction along the time axis. Readout 1302 represents a readout of all of the pixels of the image sensor, corresponding to a combination of color pixels and panchromatic pixels. For each quartet of pixels connected to a floating diffusion unit, the two color pixels and two panchromatic pixels are binned and read as a single value. Combined they produce pixel signals 1308 having a diluted Bayer pattern. The pixels are also reset at 1302 after they are read. Each floating diffusion unit is accessed once during the course of the sensor readout.

The color pixels are also reset according to rolling reset time given by 1304. The panchromatic pixels are read and reset according to the rolling shutter time given by 1306. The overall exposure for each panchromatic pixel is shown by the line 1316, which represents the time between the reset and readout of the panchromatic pixels for each row of the image sensor. The panchromatic pixel signals 1310 are generated by reading the panchromatic pixels with binning, such that the each floating diffusion unit is accessed once during the overall readout of the panchromatic pixels. Thus the panchromatic pixel readout 1306 and the readout 1302 of panchromatic pixels and color pixels have the same readout rate and same motion shear properties. This design is advantageous not just for motion shear, but also for minimizing unused light while maintaining equal exposure duration for all panchromatic pixels, as well as equal exposure duration for all color pixels.

The read pattern repeats at this stage as the next readout is of the entire image sensor according to the rolling shutter reset time given by 1302. The panchromatic pixels read at 1302 have an exposure given by 1318, while the color pixels have an exposure given by 1320. FIG. 14 shows the color pixels with a longer exposure duration 1320 than exposure duration 1318 of the panchromatic pixels readout at pixel readout 1302. This relationship is not fixed, however, and in fact the color pixel exposure duration 1320 can also be shorter than, or equal to the exposure duration of the panchromatic pixels 1318.

FIG. 14 also describes in greater detail one method of image processing 512 after each readout of pixel signals is completed. A readout of binned color and panchromatic pixel signals 1308 can be combined with neighboring readouts of binned panchromatic pixel signals 1310 to generate an improved panchromatic and color pixel image 1312. Similarly, a readout of binned panchromatic pixel signals 1310 can be combined with neighboring readouts of binned color and panchromatic pixel signals 1308 to generate an improved panchromatic and color pixel image 1312. The improved panchromatic and color pixel image 1312 can be processed to produce an enhanced quarter-resolution color image 1314. This scheme requires some buffering. Three readouts are used in the formation of each digital image 1314.

Figure 15:
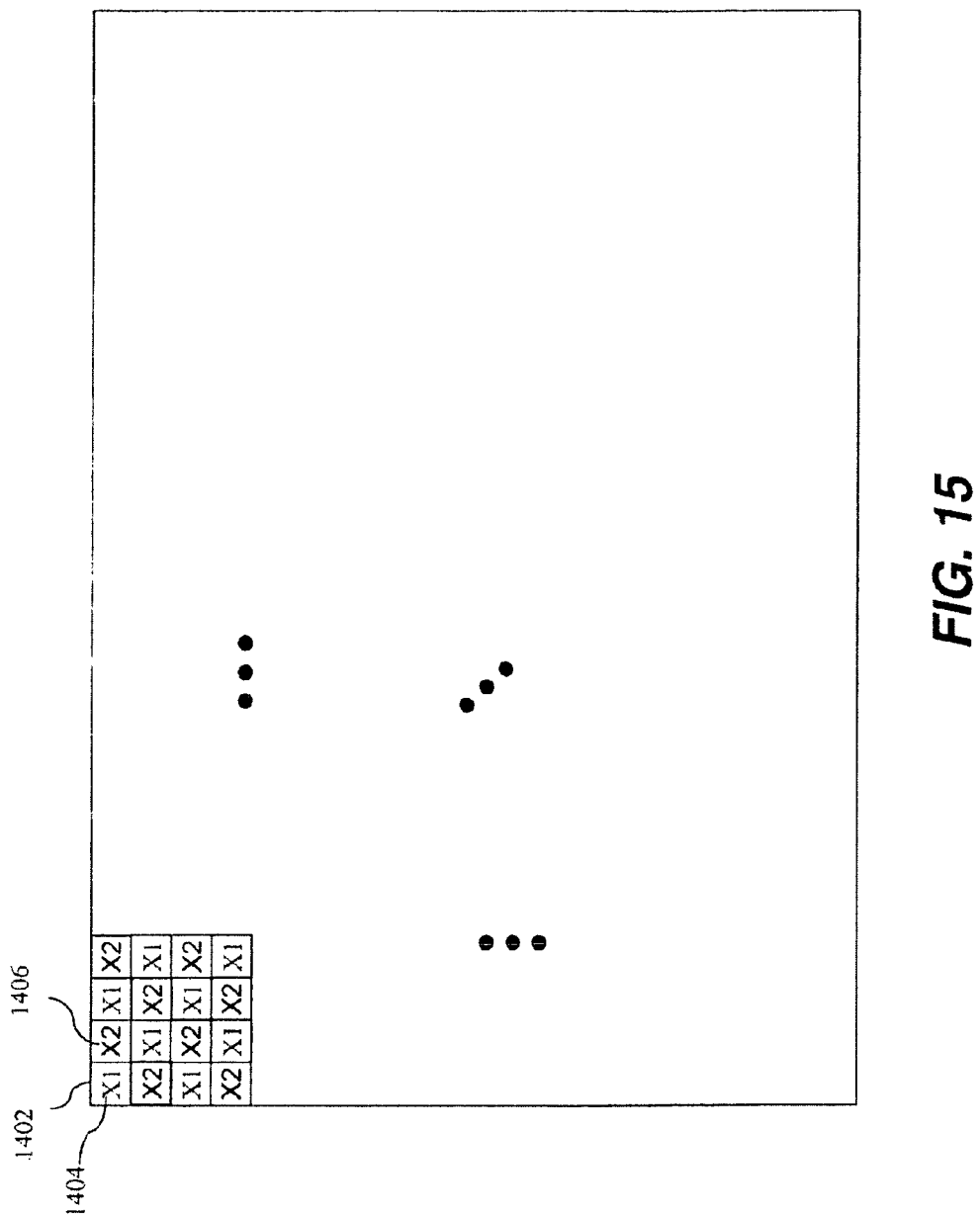
FIG. 15 is a diagram showing an example color filter array pattern containing panchromatic pixels.

Another embodiment of the present invention provides an extended dynamic range image. This is described in more detail in FIG. 15 and FIG. 16 with reference to FIG. 5. FIG. 15 provides an exemplary pixel array pattern 1402. In this example, pixels (X1) 1404 represent a first group of pixels and pixels (X2) 1406 represent a second group of pixels. X1 and X2 represent panchromatic pixels. FIG. 5 shows a timing sequence for the rolling shutter mode using the color filter array pattern shown in FIG. 15.

Figure 16:
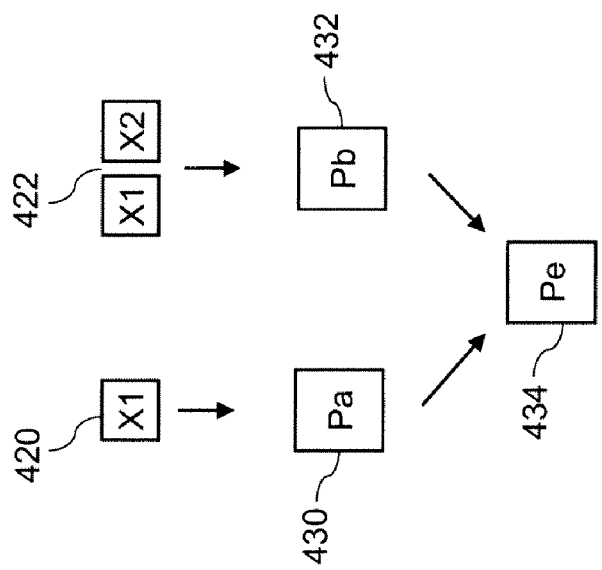
FIG. 16 is a diagram showing the generation of digital images from readouts of panchromatic pixels.

FIG. 16 describes in greater detail a method of image processing 512 from FIG. 6 after each readout of pixel signals is completed with respect to the pixel array pattern in FIG. 15. Pixel signals 420 can be appropriately processed from this initial array data to generate images 430. Pixel signals 422 can be appropriately processed from this initial array data to generate images 432. In this case, images 430 and 432 are half of the horizontal resolution of the sensor. The pixel signals for each readout are scaled by the ratio of the longest exposure for all of the readouts and the exposure for the readout. The sum of the scaled pixels signals are normalized by the number of pixel signals of the readout to produce the image values for the readout. Eq. 1 shows a simple method for computing the image values $$Pe = \sum_r \left( \sum_g (T_f / T_{r,g} * pixelssignals_{r,g}) / g \right) / r, \qquad \text{EQ. 1}$$

wherein Pe represents the extended dynamic range image values, r represents the readout, g represents the number of groups within the readout, $T_f$ represents the longest exposure, $T_{r,g}$ represents the exposure for the readout and group, and pixel signals$_{r,g}$ represents the pixel signals for the readout and group. If a pixel signal is above an upper threshold or below a lower threshold, then it is not used in the calculation for the image value and the number of groups of the readout (g) is adjusted accordingly.

The following description for FIG. 16 will demonstrate the calculation in a step-by-step process. Referring to FIG. 5, the exposure shown by line 414, corresponds to the longest exposure (TF1). The image values Pa for pixel signals 420, is given by EQ. 2

$$Pa = (TF1/TS1)*X1(420)/g(420) \qquad \text{EQ 2,}$$

wherein X1 (420) was exposed with exposure (TS1) shown by line 410, frame exposure (TF1) is shown by line 414, and number of pixel signals of the readout is g(420). The number of pixel signals of the readout, g, is the number of groups of pixels that are read for that particular readout. Since the set of pixels signals 420 only contains one group of pixels (X1), the value for g(420) is 1 in EQ.2. Similarly, the image values Pb for pixel signals 422 is given by EQ. 3

$$Pb = ((TF1/TS2)*X1(422)+X2(422))/g(422) \qquad \text{EQ 3,}$$

wherein X1(422) was exposed with exposure (TS2) shown by line 412, X2(422) was exposed with longest exposure (TF1) shown by line 414, and number of pixel signals of the readout is g(422). The value for g(422) in EQ 2. is 2 because there are two groups of pixels used to compute Pb. If the value of X1 or X2 is above an upper threshold or below a lower threshold, then it is not used in the calculation for the image value and the number of groups of the readout (g) is adjusted accordingly. Half-resolution images 432 and 430 are merged to produce a digital image 434 with an extended dynamic range value Pe. In another example, Pa and Pb are summed and divided by the number of half-resolution images to produce a half resolution digital image. In another example, the value Pe is interpolated from Pa and Pb to produce the digital image. Those skilled in the art will recognize that there are many alternative methods for calculating the extended dynamic range image.

Figure 17:
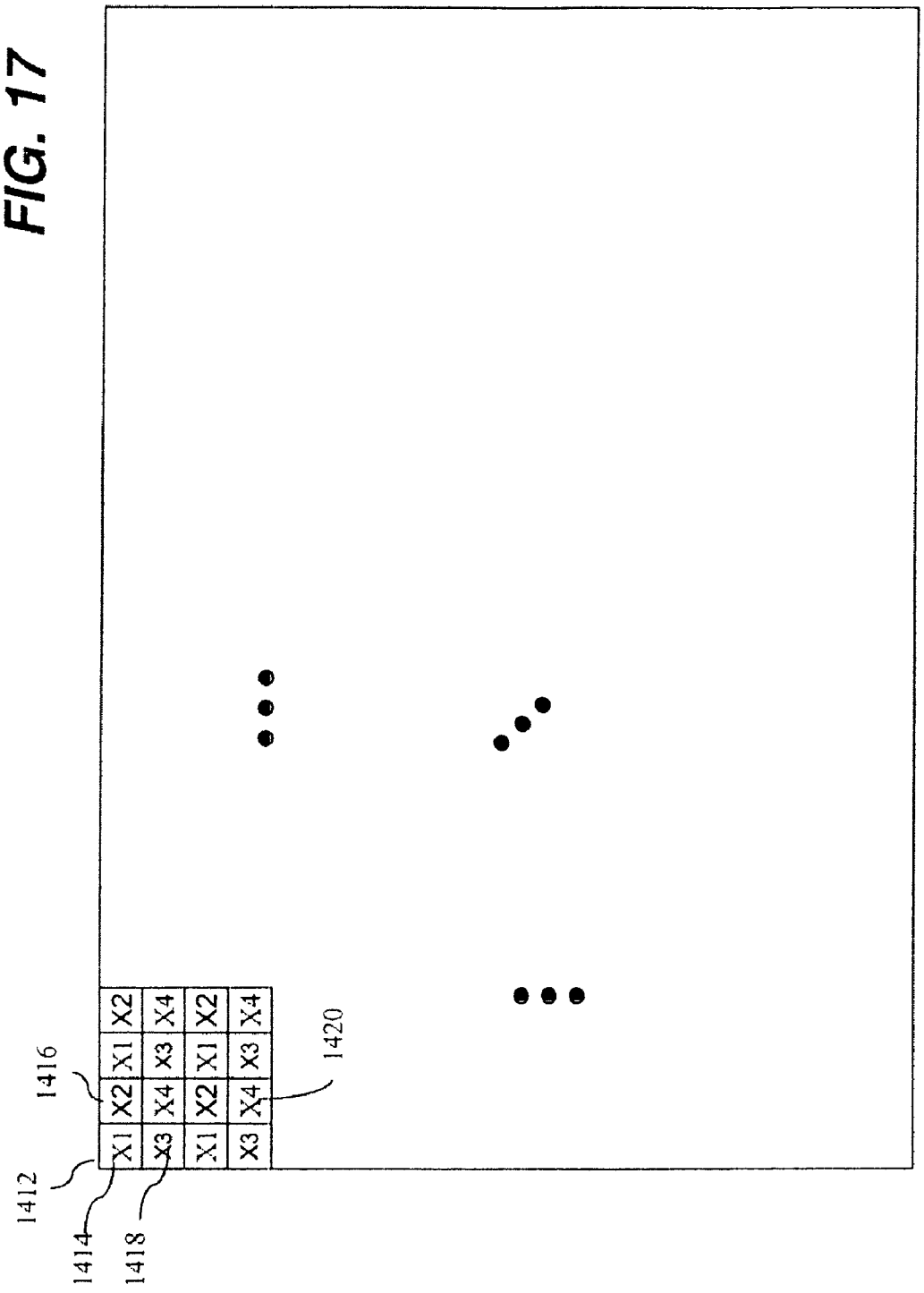
FIG. 17 is a diagram showing an example color filter array pattern containing panchromatic pixels.

FIG. 17 provides an exemplary pixel array pattern 1412 for another preferred embodiment of the present invention. In this example, pixels (X1) 1414, (X2) 1416, (X3) 1418 and (X4) 1420 represent four different groups of panchromatic pixels. In another embodiment, one or more of the panchromatic pixels can be replaced with a color pixel. The color pixel can provide color information to the final processed image. The color pixel can provide a different sensitivity than the panchromatic pixels as was previously described in FIG. 4.

Figure 18:
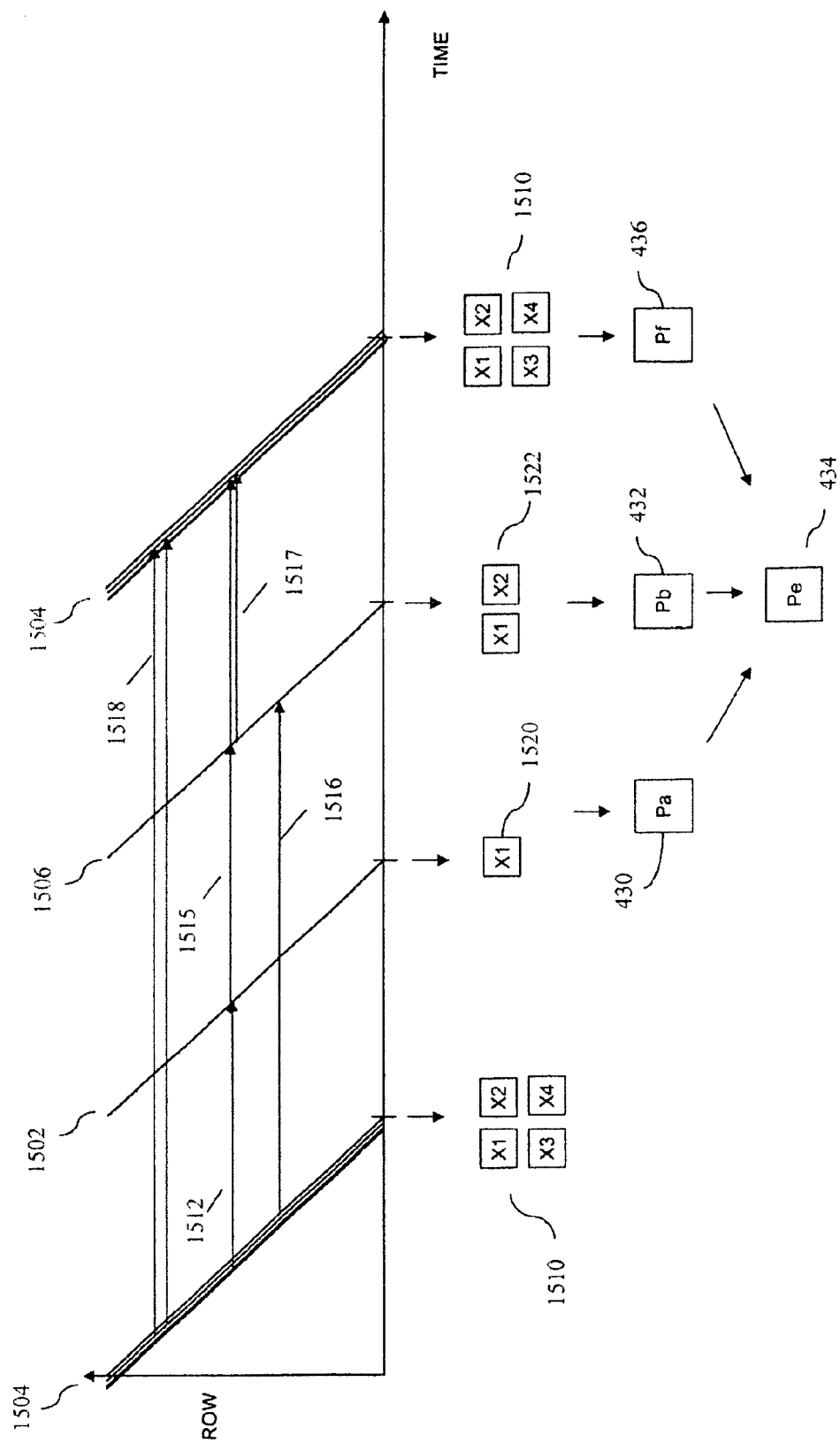
FIG. 18 is a diagram showing the generation of digital images for panchromatic pixels in an extended dynamic range embodiment of the current invention.

FIG. 18 illustrates the readout pattern and image generation for an image sensor according to another preferred embodiment of the present invention. This figure is based on an image sensor with the pixel array pattern shown in FIG. 17, and utilizing a rolling shutter readout. This collection of pixel signals represents a portion of an overall image capture process. The entire image capture process can contain additional readouts of pixel signals extending in either direction along the time axis. The rolling shutter read time given by 1504 represents a readout of pixel signals 1510 of all of the pixels (X1, X2, X3 and X4) of the image sensor. The pixels can be reset 1504 after they are read.

The X1 pixels are readout and reset according to the rolling shutter read time given by 1502. The overall exposure (TS1) for each X1 pixel is shown by the line 1512, which represents the time between the reset and read of the X1 pixels for each row of the image sensor. Pixel signals 1520 represents a readout of all of the X1 pixels.

The X1 and X2 pixels are readout and reset again according to the rolling shutter read time given by 1506. The overall exposure (TS2) for each X1 pixel is shown by the line 1515, which represents the time between the reset and read of the X1 pixels for each row of the image sensor. The overall exposure (TS3) for each X2 pixel is shown by the line 1516, which represents the time between the reset and read of the X2 pixels for each row of the image sensor. Pixel signals 1522 represents a readout of all of the X1 and X2 pixels of the image sensor. This design is advantageous because it minimizes unused light while extending the dynamic range of the sensor.

The read pattern repeats at this stage, as the next readout is of the entire image sensor according to the rolling shutter read time given by 1504. Some of the pixels readout at 1504 have a shorter exposure (TS4) given by 1517, while other pixels have a longer exposure (TF1) given by 1518.

In FIG. 18, the pixels are exposed for different durations. This is an advantageous feature of the present invention, as the different exposures allow for a greater dynamic range within a group of pixels. Another advantageous feature of the present invention is that every photon that can reach the sensor is read and available to be used. In addition, some pixel groups can be binned with other pixels groups to effectively double the sensitivity. For example, pixels from group X3 and X4 can be binned for pixel signals 1510. Pixels from group X1 and X2 can be binned for pixel signals 1510. Pixel groups with equal exposure for a given readout can be binned.

The image values calculation proceeds similar to the explanation given for FIG. 16. Pixel signals 1520 can be appropriately processed from this initial array data to generate images 430. Pixel signals 1522 can be appropriately processed from this initial array data to generate images 432. Pixel signals 1510 can be appropriately processed from this initial array data to generate images 436. Image values Pa are calculated from EQ 2. Image values Pb are calculated from EQ 4

$$Pb=((TF1/TS2)*X1+(TF1/TS3)*X2)/g \qquad \text{EQ 4,}$$

wherein X1(1522) was exposed with exposure (TS2) shown by line 1515, X2(1522) was exposed with exposure (TS3) shown by line 1516, longest exposure (TF1) is shown by line 1518, and number of pixel signals of the readout is g(1522). The image values Pf for pixel signals 1510 are given by EQ. 5

$$Pf=((TF1/TS4)*(X1+X2)+X3+X4)/g \qquad \text{EQ 5,}$$

wherein X1(1510) and X2(1510) were exposed with exposure (TS3) shown by line 1517, X3(1510) and X4(1510) were exposed with longest exposure (TF1) shown by line 1518, and number of pixel signals of the readout is g(1510). If pixel groups X1 and X2 were binned for readout 1510, a scalar would be applied to the sum of X1 and X2 to accommodate for the binning Similarly, a scalar would be applied to the sum of X3 and X4 if they were binned for readout 1510. Images 430, 432 and 436 are merged to produce a digital image 434 with an extended dynamic range value Pe Those skilled in the art will recognize that conventional automatic exposure techniques and circuitry can be adapted to accommodate the multiple sets of signals provided by embodiments of the present invention. The charge is integrated over a period of time that is long enough to collect a detectable amount of charge for all pixels while less constraint is required to avoid saturating storage elements. By optimizing the exposure durations for each of the groups of pixels for a given scene, normally clipped highlight regions of the image and dark regions can be properly exposed. A scene with a high dynamic range will provide a higher dynamic range image than a scene with a lower dynamic range.

Figure 19:
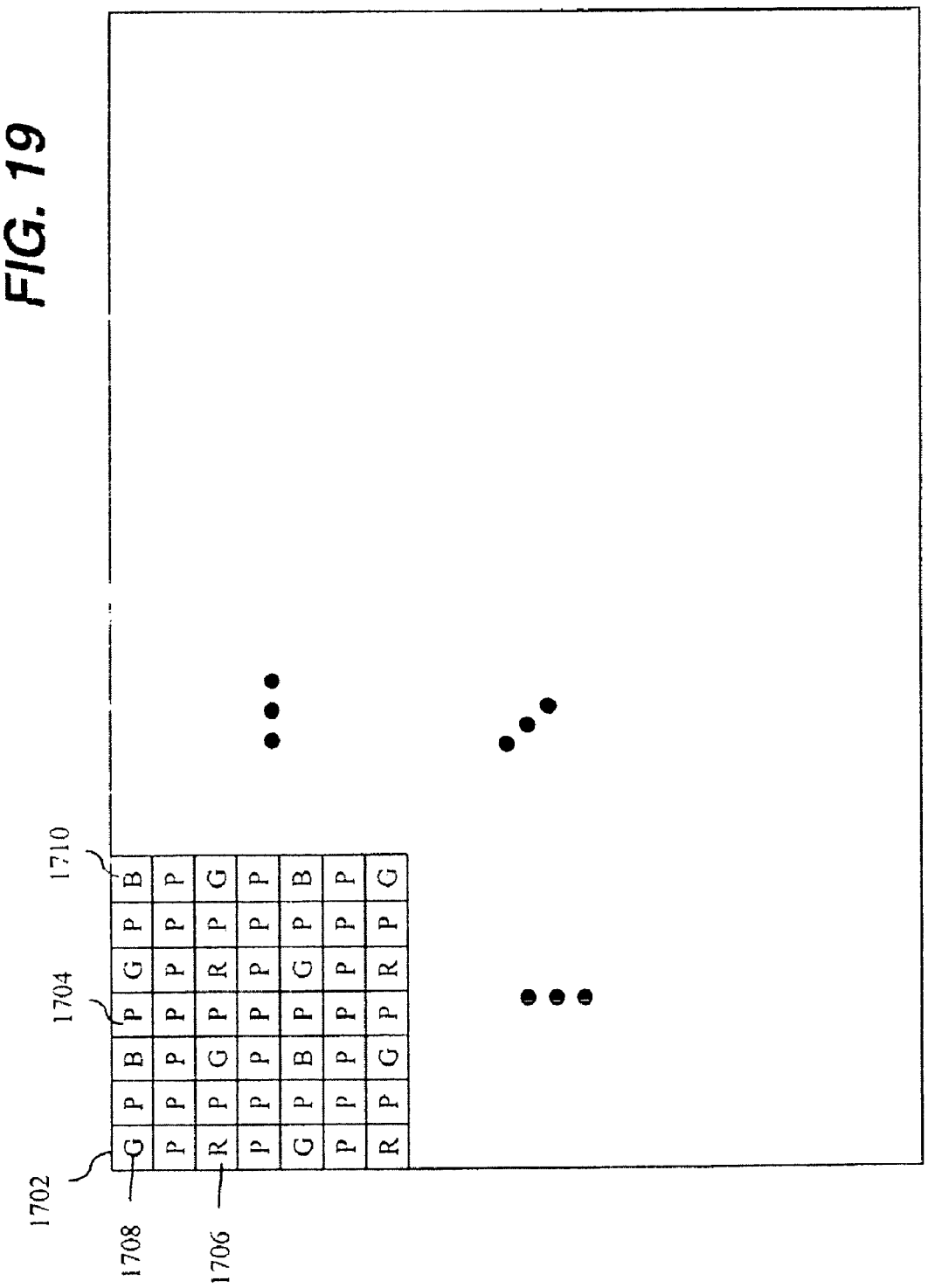
FIG. 19 is a diagram showing an example color filter array pattern containing panchromatic pixels and color pixels.

FIG. 19 illustrates an example color filter array pattern 1702 for a preferred embodiment of the present invention. In this example, pixels are panchromatic (P) 1704, red (R) 1706, green (G) 1708 and blue (B) 1710. The color filter array pattern 1702 has a minimal repeating unit containing 16 pixels in the following 4 by 4 array:

| G | P | B | P |
| --- | --- | --- | --- |
| P | P | P | P |
| R | P | G | P |
| P | P | P | P. |

Figure 20:
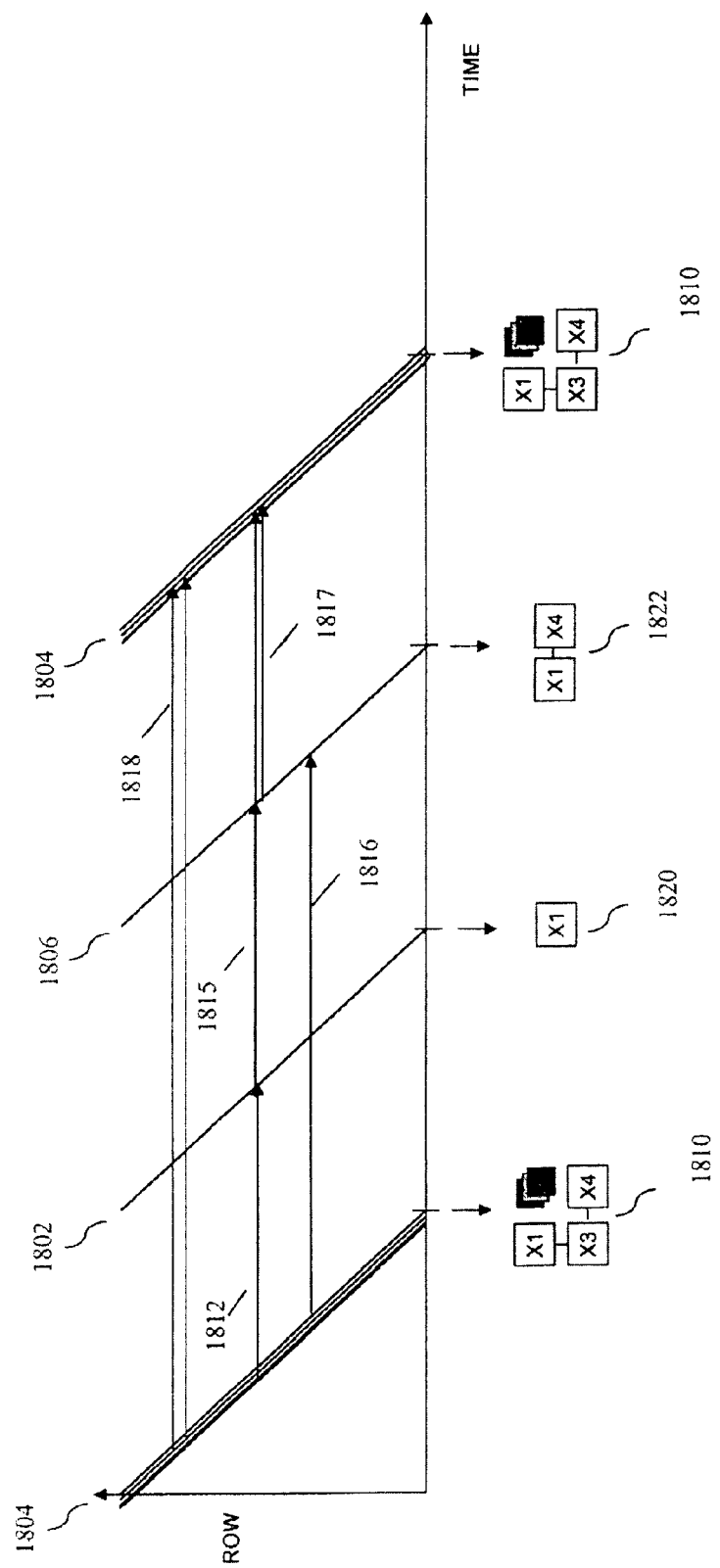
FIG. 20 is a timing diagram showing rolling shutter operation for panchromatic pixels in an embodiment of the current invention.

Those skilled in the art will recognize that other color filter array configurations and minimal repeating units are possible within the scope of the present invention. FIG. 20 illustrates the readout pattern and image generation for an image sensor according to another preferred embodiment of the present invention. This figure is based on an image sensor with a color filter array pattern shown in FIG. 19, and utilizing a rolling shutter readout. This is a slight variation from the readout pattern illustrated in FIG. 18 in that a color pixel has replaced one of the panchromatic pixels X2. This is useful in applications that require greater dynamic range with some color information. This collection of pixel signals represents a portion of an overall image capture process. The entire image capture process can contain additional readouts of pixel signals extending in either direction along the time axis. The rolling shutter read time given by 1804 represents a readout of pixel signals 1810 of all of the pixels (X1, color, X3 and X4) of the image sensor. The pixels can be reset 1804 after they are read.

The X1 pixels are readout and reset according to the rolling shutter read time given by 1802. The overall exposure for each X1 pixel is shown by the line 1812, which represents the time between the reset and read of the X1 pixels for each row of the image sensor. Pixel signals 1820 represents a readout of all of the X1 pixels.

The X1 and X4 pixels are readout and reset again according to the rolling shutter read time given by 1806. The overall exposure for each X1 pixel is shown by the line 1815, which represents the time between the reset and read of the X1 pixels for each row of the image sensor. The overall exposure for each X4 pixel is shown by the line 1816, which represents the time between the reset and read of the X4 pixels for each row of the image sensor. Pixel signals 1822 represents a readout of all of the X1 and X4 pixels of the image sensor. This design is advantageous because it minimizes unused light while extending the dynamic range of the sensor.

The read pattern repeats at this stage, as the next readout is of the entire image sensor according to the rolling shutter read time given by 1804. Some of the pixels readout at 1804 have a shorter exposure given by 1817, while other pixels have a longer exposure given by 1818.

In FIG. 18, the pixels are exposed for different durations. This is an advantageous feature of the present invention, as the different exposures allow for a greater dynamic range within a group of pixels. Another advantageous feature of the present invention is that every photon that can reach the sensor is read and available to be used. In addition, some pixel groups can be binned with other pixels groups to effectively double the sensitivity. For example, pixels from group X3 and color can be binned for pixel signals 1810. Pixels from group X1 and X4 can be binned for pixel signals 1810. Pixel groups with equal exposure for a given readout can be binned.

Those skilled in the art will recognize that there are many alternative methods to the present invention.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

PARTS LIST

10 Light
11 Imaging stage
12 Lens
13 Filter block
14 Iris
16 Sensor block
18 Shutter block
20 Image Sensor
22 Analog signal processor
24 A/D converter
26 Timing generator
28 Sensor stage
30 Bus
32 DSP Memory
36 Digital signal processor
38 Processing Stage
40 Exposure controller
50 System controller
52 Bus
54 Program memory
56 System memory
57 Host interface
60 Memory card interface
62 Socket
64 Memory card
68 User interface
70 Viewfinder display
72 Exposure display
74 User inputs
76 Status display
80 Video encoder
82 Display controller
88 Image display
100 Block
102 Block
110 Filter transmission curve
112 Panchromatic photo-response curve
114 Color photo-response curve
116 Color photo-response curve
118 Color photo-response Curve
300 Reset process
302 Readout process
320 Pixel integration time
402 Rolling shutter read time
404 Rolling shutter read time
410 Pixel exposure
412 Pixel exposure
414 Pixel exposure
420 Pixel signals
422 Pixel signals
430 Image
432 Image
434 Digital Image
436 Image
502 Sequence of image capture
504 Sensor
506 Sensor
508 Image Sensor
510 Pixel signals
512 Image processing step
514 digital image
516 digital image utilization
518 Image capture complete query
520 Image capture process termination
522 Next read from sensor
602 Color filter array pattern
604 Panchromatic pixel
606 Red pixel
608 Green pixel
610 Blue pixel
701 Row
702 Row
704 Floating diffusion
706 Pixel quartet
708 Readout combination
710 Readout combination
712 Readout combination
714 Readout combination
802 Panchromatic pixel readout
804 Pixel readout and reset
806 Rolling shutter reset time
808 Rolling shutter reset time
810 Panchromatic and color pixel signals
812 Pixel signals
814 Panchromatic pixel exposure
816 Panchromatic pixel exposure 818 Color pixel exposure
902 Quarter-resolution color image
904 Sensor-resolution panchromatic image
906 digital image
1002 digital image
1202 Quarter-resolution color image
1204 Sensor-resolution color image
1206 Up-sample block
1208 Sensor-resolution up-sampled color image
1210 Residual image formation block
1212 Residual image
1302 Pixel readout and reset
1304 Color pixel reset
1306 Panchromatic pixel readout and reset
1308 Pixel signals
1310 Panchromatic pixel signals
1312 Color pixel image
1314 digital image
1316 Panchromatic pixel exposure
1318 Panchromatic pixel exposure
1320 Color pixel exposure
1402 Pixel array pattern
1404 First group of pixels
1406 Second group of pixels
1412 Pixel array pattern
1414 First group of pixels
1416 Second group of pixels
1418 Third group of pixels
1420 Fourth group of pixels
1502 Rolling shutter read time
1504 Rolling Shutter Read time
1506 Rolling shutter read time
1510 Pixel signals
1512 Pixel exposure
1515 Pixel exposure
1516 Pixel exposure
1517 Pixel exposure
1518 Pixel exposure
1520 Pixel signals
1522 Pixel signals
1702 Color filter array pattern
1704 First group of pixels
1706 Second group of pixels
1708 Third group of pixels
1710 Fourth group of pixels
1802 Pixel readout and reset
1804 Pixel readout and reset
1806 Pixel readout and reset
1810 Pixel signals
1812 Pixel exposure
1815 Pixel exposure
1816 Pixel exposure
1817 Pixel exposure
1818 Pixel exposure
1820 Pixel signals
1822 Pixel signals

The invention claimed is:

1. A method for producing a digital image, the method comprising:
providing an image sensor with at least a first group of pixels and a second group of pixels;
reading out first pixel signals from the first group of pixels, the first pixel signals generated during a first exposure duration, wherein the first group of pixels is reset after reading out the first pixel signals generated during the first exposure period;
reading out second pixels signals from the first group of pixels after resetting the first group of pixels, the second pixel signals generated during a second exposure period;
reading out third pixel signals from the second group of pixels, the third pixel signals generated during a third exposure period that overlaps at least a portion of the first and second exposure periods; and
using at least the first, second, and third pixel signals to produce the digital image.

2. The method of claim 1, wherein the second pixel group includes at least one color pixels and the first pixel group includes at least one panchromatic pixels.

3. The method of claim 1 further comprising:
reading out fourth pixel signals from the first group of pixels after reading out the second pixel signals and then resetting the first pixel group, the fourth pixel signals generated during a fourth exposure period following the second exposure period;
reading out fifth pixel signals from a third group of pixels, the fifth pixel signals generated during a fifth exposure period that overlaps at least a portion of the first, second, and third exposure periods, wherein the image sensor includes the first, second, and third groups of pixels; and
using the fourth and fifth pixel signals to produce the digital image.

4. The method of claim 3 further comprising:
reading out sixth pixel signals from the second group of pixels after reading out the third pixel signals and then resetting the second pixel group, the sixth pixel signals generated during a sixth exposure period following the third exposure period; and
using the sixth pixel signals to produce the digital image.

5. The method of claim 4 further comprising:
reading out seventh pixel signals from a fourth pixel group, the seventh pixel signals generated during a seventh exposure period substantially the same as the fifth exposure period; and
using the seventh pixel signals to produce the digital image.

6. The method of claim 5, wherein the second pixel group includes at least one color pixels, and wherein the first, third, and fourth pixel groups include at least one panchromatic pixels.

7. The method of claim 5, wherein the second pixel group is a color pixel and the first, third, and fourth pixel groups are panchromatic (P) pixels.

8. The method of claim 7, wherein a first, second, third, and fourth pixel configuration of a pixel pattern each includes the first, second, third, and fourth pixel groups, wherein the color pixel of the first, second, third, and fourth pixel module is red (R), green (G), green (G), and blue (B), respectively.

9. The method of claim 8, wherein the pixel pattern is arranged in the image sensor as:

| G | P | B | P |
| P | P | P | P |
| R | P | G | P |
| P | P | P | P. |

10. The method of claim 5, wherein the first (1), second (2), third (3), and fourth (4) pixel groups are arranged in a pixel pattern in the image sensor as:

$$\begin{matrix} 1 & 2 \\ 3 & 4 \end{matrix}.$$

11. The method of claim 5, wherein the fourth pixel signals and the sixth pixel signals are binned.

12. The method of claim 5, wherein the fifth pixel signals and the seventh pixel signals are binned.

13. The method of claim 1, wherein the first group of pixels (1) and the second group of pixels (2) are panchromatic pixels arranged in a pixel pattern as:

$$\begin{matrix} 1 & 2 \\ 2 & 1 \end{matrix},$$

and wherein producing the digital image includes:
 processing the first pixel signals to generate a first image and processing the second and third pixel signals to generate a second image, wherein the first image and the third image are half of the horizontal resolution of the image sensor; and
 combining the first image and the second image to generate the digital image with extended dynamic range.

14. The method of claim 13, wherein processing the first pixel signals to generate a first image and processing the second and third pixel signals to generate the second image includes:
 scaling the first, second, and third pixel signals by a ratio to generate first, second, and third scaled pixel signals, the ratio being a first duration of the third exposure period divided by an actual duration corresponding to the respective exposure period of the respective pixel signals; and
 normalizing a sum of the first, second, and third scaled pixel signals by a number of pixel signals of each respective readout.

15. An imaging system comprising:
 a pixel array including at least a first group of pixels and a second group of pixels;
 control logic coupled to acquire image data from the pixel array; and
 a non-transistory machine-accessible storage medium that provides instructions that, when executed by the imaging system, will cause the imaging system to perform operations comprising:
  reading out first pixel signals from the first group of pixels, the first pixel signals generated during a first exposure duration, wherein the first group of pixels is reset after reading out the first pixel signals generated during the first exposure period;
  reading out second pixels signals from the first group of pixels after resetting the first group of pixels, the second pixel signals generated during a second exposure period;
  reading out third pixel signals from the second group of pixels, the third pixel signals generated during a third exposure period that overlaps at least a portion of the first and second exposure periods; and
  using at least the first, second, and third pixel signals to produce a digital image.

16. The imaging system of 15, wherein the second pixel group includes at least one color pixels and the first pixel group includes at least one panchromatic pixels.

17. The imaging system of 15, with further instructions stored in the non-transitory machine accessible storage medium, that when executed by the imaging system, will cause the imaging system to perform operations comprising:
 reading out fourth pixel signals from the first group of pixels after reading out the second pixel signals and then resetting the first pixel group, the fourth pixel signals generated during a fourth exposure period following the second exposure period;
 reading out fifth pixel signals from a third group of pixels, the fifth pixel signals generated during a fifth exposure period that overlaps at least a portion of the first, second, and third exposure periods, wherein the pixel array includes the first, second, and third groups of pixels; and
 using the fourth and fifth pixel signals to produce the digital image.

18. The imaging system of 17 with further instructions stored in the non-transitory machine accessible storage medium, that when executed by the imaging system, will cause the imaging system to perform operations comprising:
 reading out sixth pixel signals from the second group of pixels after reading out the third pixel signals and then resetting the second pixel group, the sixth pixel signals generated during a sixth exposure period following the third exposure period; and
 using the sixth pixel signals to produce the digital image.

19. The imaging system of 18 with further instructions stored in the non-transitory machine accessible storage medium, that when executed by the imaging system, will cause the imaging system to perform operations comprising:
 reading out seventh pixel signals from a fourth pixel group, the seventh pixel signals generated during a seventh exposure period substantially the same as the fifth exposure period; and
 using the seventh pixel signals to produce the digital image.

20. The imaging system of 19, wherein the second pixel group includes at least one color pixels, and wherein the first, third, and fourth pixel groups include at least one panchromatic pixels.

21. The imaging system of 19, wherein the second pixel group is a color pixel and the first, third, and fourth pixel groups are panchromatic (P) pixels.

22. The imaging system of 21, wherein a first, second, third, and fourth pixel configuration of a pixel pattern each includes the first, second, third, and fourth pixel groups, wherein the color pixel of the first, second, third, and fourth pixel module is red (R), green (G), green (G), and blue (B), respectively.

23. The imaging system of 22, wherein the pixel pattern is arranged in the pixel array as:

$$\begin{matrix} G & P & B & P \\ P & P & P & P \\ R & P & G & P \\ P & P & P & P \end{matrix}.$$

24. The imaging system of 19, wherein the first (1), second (2), third (3), and fourth (4) pixel groups are arranged in a pixel pattern in the pixel array as:

$$\begin{matrix} 1 & 2 \\ 3 & 4 \end{matrix}.$$

25. The imaging system of 19, wherein the fourth pixel signals and the sixth pixel signals are binned.

26. The imaging system of 19, wherein the fifth pixel signals and the seventh pixel signals are binned.

27. The imaging system of claim 15, wherein the first group of pixels (1) and the second group of pixels (2) are panchromatic pixels arranged in a pixel pattern as:

12

21, and wherein producing the digital image includes:
  processing the first pixel signals to generate a first image and processing the second and third pixel signals to generate a second image, wherein the first image and the third image are half of the horizontal resolution of the image sensor; and
  combining the first image and the second image to generate the digital image with extended dynamic range.

28. The imaging system of claim 27, wherein processing the first pixel signals to generate a first image and processing the second and third pixel signals to generate the second image includes:
  scaling the first, second, and third pixel signals by a ratio to generate first, second, and third scaled pixel signals, the ratio being a first duration of the third exposure period divided by an actual duration corresponding to the respective exposure period of the respective pixel signals; and
  normalizing a sum of the first, second, and third scaled pixel signals by a number of pixel signals of each respective readout.

29. A method for producing a digital image, the method comprising:
  providing an image sensor with two color pixels and two panchromatic pixels, wherein the two color pixels and the two panchromatic share a floating diffusion;
  resetting the two panchromatic pixels;
  reading out unbinned panchromatic signals of the two panchromatic pixels generated during a first exposure period initiated after resetting the two panchromatic pixels;
  reading out binned color signals of the two color pixels generated during a second exposure period initiated before reading out the unbinned panchromatic signals;
  reading out binned panchromatic signals of the two panchromatic pixels generated during a third exposure period initiated after reading out the unbinned panchromatic signals; and
  using at least the unbinned panchromatic signals, the binned color signals, and the binned panchromatic signals to produce the digital image.

30. The method of claim 29, wherein reading out binned color signals and the binned panchromatic signals is during a same shutter.

31. The method of claim 30, wherein the same shutter is a rolling shutter.

32. The method of claim 29, wherein a first duration of the first exposure period is approximately two times a second duration of the third exposure period.

33. The method of claim 32, wherein a third duration of the second exposure period is approximately equal to a sum of the first duration and the second duration.

34. The method of claim 29, wherein producing the digital image includes color-interpolating the binned color signals and the binned panchromatic signals and spatially interpolating the unbinned panchromatic signals.

35. The method of claim 34, wherein the digital image has the spatial resolution of the image sensor.

36. The method of claim 34, wherein the digital image is an enhanced quarter-resolution digital image that is one half the vertical resolution of the image sensor and one half the horizontal resolution of the image sensor.

37. A method for producing a digital image, the method comprising:
  providing an image sensor having pairs of color pixels sharing floating diffusions with pairs of panchromatic pixels, the pairs of color pixels including a pair of first color pixels, a pair of second color pixels, and a pair of third color pixels;
  resetting each of the pairs of panchromatic pixels and initiating a first exposure period;
  reading out binned panchromatic signals from the pairs of panchromatic pixels, wherein the panchromatic signals were generated during the first exposure period;
  resetting each of the pairs of panchromatic pixels and initiating a second exposure period after reading out the binned panchromatic signals;
  resetting each of the pairs of color pixels and initiating a third exposure period;
  reading out binned color/panchromatic signals, wherein the binned color/panchromatic signals are generated during the second and third exposure period and the binned color/panchromatic signals include image charge from the pairs of color pixels and the pairs of panchromatic pixels stored together in each of the floating diffusions; and
  generating the digital image using at least the binned panchromatic signals and the binned color/panchromatic signals.

38. The method of claim 37, wherein a first duration of the first exposure period is approximately equal to a second duration of the second exposure period.

39. The method of claim 37, wherein the third exposure period starts before the second exposure period.

40. The method of claim 37, wherein the third exposure period starts after the second exposure period.

41. The method of claim 37, wherein the first color pixels are red pixels, the second color pixels are green pixels, and the third color pixels are blue pixels.

42. The method of claim 41, wherein the binned color/panchromatic signals include a diluted Bayer pattern.

* * * * *